US012241609B2

(12) United States Patent
Jin

(10) Patent No.: US 12,241,609 B2
(45) Date of Patent: Mar. 4, 2025

(54) VEHICLE LAMP

(71) Applicant: HYUNDAI MOBIS CO., LTD., Seoul (KR)

(72) Inventor: Min Ji Jin, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/455,593

(22) Filed: Aug. 24, 2023

(65) Prior Publication Data

US 2024/0151376 A1 May 9, 2024

(30) Foreign Application Priority Data

Nov. 3, 2022 (KR) ........................ 10-2022-0145509

(51) Int. Cl.
*F21S 41/265* (2018.01)
*F21S 41/143* (2018.01)
*F21S 41/151* (2018.01)
*F21S 41/32* (2018.01)
*F21S 41/365* (2018.01)
*F21S 45/47* (2018.01)

(52) U.S. Cl.
CPC ........... *F21S 41/265* (2018.01); *F21S 41/143* (2018.01); *F21S 41/151* (2018.01); *F21S 41/321* (2018.01); *F21S 41/365* (2018.01); *F21S 45/47* (2018.01)

(58) Field of Classification Search
CPC ...... F21S 41/365; F21S 41/265; F21S 41/143; F21S 41/321
See application file for complete search history.

(56) References Cited

U.S. PATENT DOCUMENTS

| | | | | |
|---|---|---|---|---|
| 7,168,836 B2 * | 1/2007 | Tatsukawa | F21S 41/155 | 362/328 |
| 7,980,742 B2 * | 7/2011 | Albou | F21S 41/365 | 362/520 |
| 10,239,443 B2 * | 3/2019 | Kanayama | F21S 41/663 | |
| 10,451,237 B1 * | 10/2019 | Zorn | F21S 41/43 | |
| 11,041,600 B2 * | 6/2021 | Sato | F21S 43/241 | |
| 11,953,172 B2 * | 4/2024 | Röhm | F21S 41/27 | |
| 2006/0285347 A1 * | 12/2006 | Okada | F21S 41/147 | 362/516 |

* cited by examiner

*Primary Examiner* — Matthew J. Peerce
(74) *Attorney, Agent, or Firm* — DLA Piper LLP US

(57) ABSTRACT

A vehicle lamp includes a first optical module including a first light source part, a first sub-light source part that is lighted individually with the first light source part, and a first reflector that reflects a light beam irradiated from the first sub-light source part, a second optical module including a second light source part, a second sub-light source part that is lighted individually with the second light source part, and a second reflector that reflects a light beam irradiated from the second sub-light source part, and a third optical module including a third light source part, a third sub-light source part that is lighted individually with the third light source part, and a third reflector that reflects a light beam irradiated from the third sub-light source part.

16 Claims, 35 Drawing Sheets

VEHICLE LAMP

CROSS-REFERENCE TO RELATED APPLICATION

This application claims the benefit of priority to Korean Patent Application No. 10-2022-0145509, filed in the Korean Intellectual Property Office on Nov. 3, 2022, the entire contents of which are incorporated herein by reference.

TECHNICAL FIELD

The present disclosure relates to a vehicle lamp.

BACKGROUND

In general, vehicles are provided with various types of lamps having a lighting function for easily identifying an object located around a vehicle during night traveling and a signal function for notifying other vehicles or road users of a traveling state of the vehicle.

Among the vehicle lamps, head lamps that form a low beam light distribution pattern or a high beam pattern to ensure forward vision of a driver during night traveling play an important role in safe traveling. Further, in recent years, differentiation of designs of the head lamps has been considered important.

In recent years, vehicle lamps have been preferred in which signal lamps or daytime running lamps are arranged side by side in low beam/high beam lamps and the low beam/high beam lamps emit light beams together during signaling or daytime running operation. Thus, to satisfy the needs of consumers, a technology in which the low beam/high beam lamps also uniformly emit light beams when the signal lamps or the like operate needs to be developed.

Further, in recent years, to differentiate the designs of the vehicle lamps, the vehicle lamps for implementing line-shaped lighting images instead of a plurality of dot-shaped lighting images have been developed.

However, there is a limit to implementing the line-shaped lighting image using a separated optical module according to the related art and a structure thereof. In particular, when the related art is used, it is difficult to implement an optical system having a continuous image without a disconnection sense in a lighted state. Thus, an optical system technology that may implement a continuous line-shaped image needs to be developed.

SUMMARY

The present disclosure has been made to solve the above-mentioned problems occurring in the prior art while advantages achieved by the prior art are maintained intact.

An aspect of the present disclosure provides a vehicle lamp that improves light uniformity of a light distribution pattern, secures design differentiation, and thus enhances the competitiveness of a product.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle lamp includes a first optical module including a first light source part that forms a first light distribution pattern, a first sub-light source part that is lighted individually with the first light source part and forms a first sub-light distribution pattern, and a first reflector that reflects a light beam irradiated from the first sub-light source part, a second optical module including a second light source part that forms a second light distribution pattern, a second sub-light source part that is lighted individually with the second light source part and forms a second sub-light distribution pattern, and a second reflector that reflects a light beam irradiated from the second sub-light source part; and a third optical module including a third light source part that forms a third light distribution pattern, a third sub-light source part that is lighted individually with the third light source part and forms a third sub-light distribution pattern, and a third reflector that reflects a light beam irradiated from the third sub-light source part, wherein each of the first reflector, the second reflector, and third reflector includes a curved reflective surface for reflecting the light beam.

The first optical module may further include a first output lens part that outputs the light beam irradiated from the first light source part and the first sub-light source part, the second optical module may further include a second output lens part that outputs the light beam emitted from the second light source part and the second sub-light source part, the third optical module may further include a third output lens part that outputs the light beam emitted from the third light source part and the third sub-light source part, the first optical module, the second optical module, and the third optical module may be arranged in a vertical direction, and the first output lens part, the second output lens part, and the third output lens part may be integrally formed in the vertical direction.

The first optical module may further include a first condensing lens part that condenses the light beam emitted from the first light source part or the first sub-light source part, the second optical module may further include a second condensing lens part that condenses the light beam emitted from the second light source part or the second sub-light source part, and the third optical module may further include a third condensing lens part that condenses the light beam emitted from the third light source part or the third sub-light source part.

The vehicle lamp may further include a first lamp unit including the first optical module, the second optical module, and the third optical module, and a second lamp unit that forms a main light distribution pattern and includes a main light source part and a main lens part that outputs a light beam input from the main light source part, wherein the main light source part may be lighted together with the first sub-light source part, the second sub-light source part, and the third sub-light source part.

The first light distribution pattern, the second light distribution pattern, and the third light distribution pattern may be formed to have different light distribution characteristics, the first light distribution pattern and the second light distribution pattern may overlap each other to form a low beam light distribution pattern, and the third light distribution pattern may form a high beam light distribution pattern.

The main light distribution pattern, the first sub-light distribution pattern, the second sub-light distribution pattern, and the third sub-light distribution pattern may overlap each other to form at least one of a daytime running pattern and a turn signal pattern.

The first reflector may include a (1-1)th reflector having a (1-1)th reflective surface that reflects the light beam irradiated from the first sub-light source part and is formed in a curved surface on a lower surface thereof, and a (1-2)th reflector having a (1-2)th reflective surface that reflects the light beam reflected from the (1-1)th reflective surface to the first output lens part and is formed in a curved surface on an upper surface thereof, the second reflector may include a (2-1)th reflector having a (2-1)th reflective surface that reflects the light beam irradiated from the second sub-light source part and is formed in a curved surface on a lower surface thereof, and a (2-2)th reflector having a (2-2)th reflective surface that reflects the light beam reflected from the (2-1)th reflective surface to the second output lens part and is formed in a curved surface on an upper surface thereof, and the third reflector may include a (3-1)th reflector having a (3-1)th reflective surface that reflects the light beam irradiated from the third sub-light source part and is formed in a curved surface on a lower surface thereof, and a (3-2)th reflector having a (3-2)th reflective surface that reflects the light beam reflected from the (3-1)th reflective surface to the third output lens part and is formed in a curved surface on an upper surface thereof.

A height of the first sub-light source part may be smaller than a height of a center of the first condensing lens part and greater than a height of a lower end of the first condensing lens part, a height of the second sub-light source part may be smaller than a height of a center of the second condensing lens part and greater than a height of a lower end of the second condensing lens part, and a height of the third sub-light source part may be smaller than a height of a center of the third condensing lens part and greater than a height of a lower end of the third condensing lens part.

Each of the (1-1)th reflector, the (2-1)th reflector, and the (3-1)th reflector may have a concave lower surface and a vertical cross section formed as a partial shape of a virtual ellipse.

Each of the (1-2)th reflector, the (2-2)th reflector, and the (3-2)th reflector may have a convex upper surface and a vertical cross section formed as a partial shape of a virtual circle.

The (1-1)th reflective surface may be positioned on the (1-2)th reflective surface, the (2-1)th reflective surface may be positioned on the (2-2)th reflective surface, and the (3-1)th reflective surface may be positioned on the (3-2)th reflective surface.

A height of each of the (1-1)th reflective surface, the (2-1)th reflective surface, and the (3-1)th reflective surface may be greater than a height of a center of each of the first condensing lens part, the second condensing lens part, and the third condensing lens part.

A focal point of the (1-1)th reflective surface may be positioned on the (1-2)th reflective surface, a focal point of the (2-1)th reflective surface may be positioned on the (2-2)th reflective surface, and a focal point of the (3-1)th reflective surface may be positioned on the (3-2)th reflective surface.

When a point between a lower end of the first condensing lens part and a center of the first condensing lens part is referred to as a first lower midpoint, a height of the first sub-light source part may be greater than a height of the lower end of the first condensing lens part and smaller than a height of the first lower midpoint.

A height of a focal point of the (1-1)th reflective surface may be smaller than a height of a vertical focal point of the first output lens part by a distance that is 1/10 a vertical focal distance of the first output lens part.

When a point between a lower end of the second condensing lens part and a center of the second condensing lens part is referred to as a second lower midpoint, a height of the second sub-light source part may be greater than a height of the lower end of the second condensing lens part and smaller than a height of the second lower midpoint.

A height of a focal point of the (2-1)th reflective surface may be smaller than a height of a vertical focal point of the second output lens part by a distance that is 1/5 a vertical focal distance of the second output lens part.

When a point between a lower end of the third condensing lens part and a center of the third condensing lens part is referred to as a third lower midpoint, a height of the third sub-light source part may be greater than a height of the lower end of the third condensing lens part and smaller than a height of the third lower midpoint.

A height of a focal point of the (3-1)th reflective surface may be smaller than a height of a vertical focal point of the third output lens part by a distance that is 1/10 a vertical focal distance of the third output lens part.

According to another aspect of the present disclosure, an optical module includes a light source part that forms a predetermined light distribution pattern, a sub-light source part that is lighted individually with the light source part and forms a sub-light distribution pattern, a reflector that reflects a light beam irradiated from the sub-light source part, a condensing lens part that condenses the light beam emitted from the light source part or the sub-light source part, an output lens part that outputs the light beam irradiated from the light source part and the sub-light source part, and a shield part that is provided between the condensing lens part and the output lens part and blocks a portion of the light beam, wherein the reflector includes a first reflector having a first reflective surface that reflects the light beam irradiated from the sub-light source part and is formed in a curved surface on a lower surface thereof, and a second reflector having a second reflective surface that reflects the light beam reflected from the first reflective surface to the output lens part and is formed in a curved surface on an upper surface thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments suitable for understanding technical features of a vehicle lamp according to the present disclosure. However, the present disclosure is not limited to the embodiments described below, the technical features of the present disclosure are not limited by the described embodiments, and various modifications may be made within the technical scope of the present disclosure.

Figure 1:
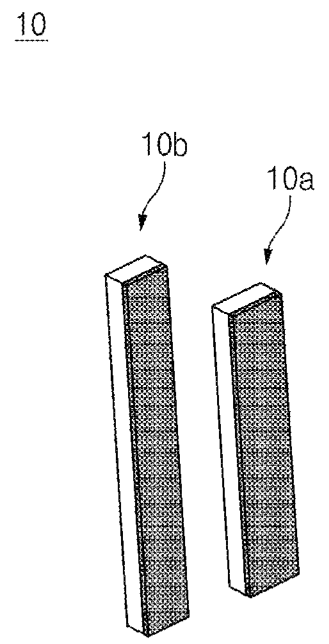
FIG. 1 is a perspective view illustrating a vehicle lamp according to a first embodiment of the present disclosure.
Figure 2:
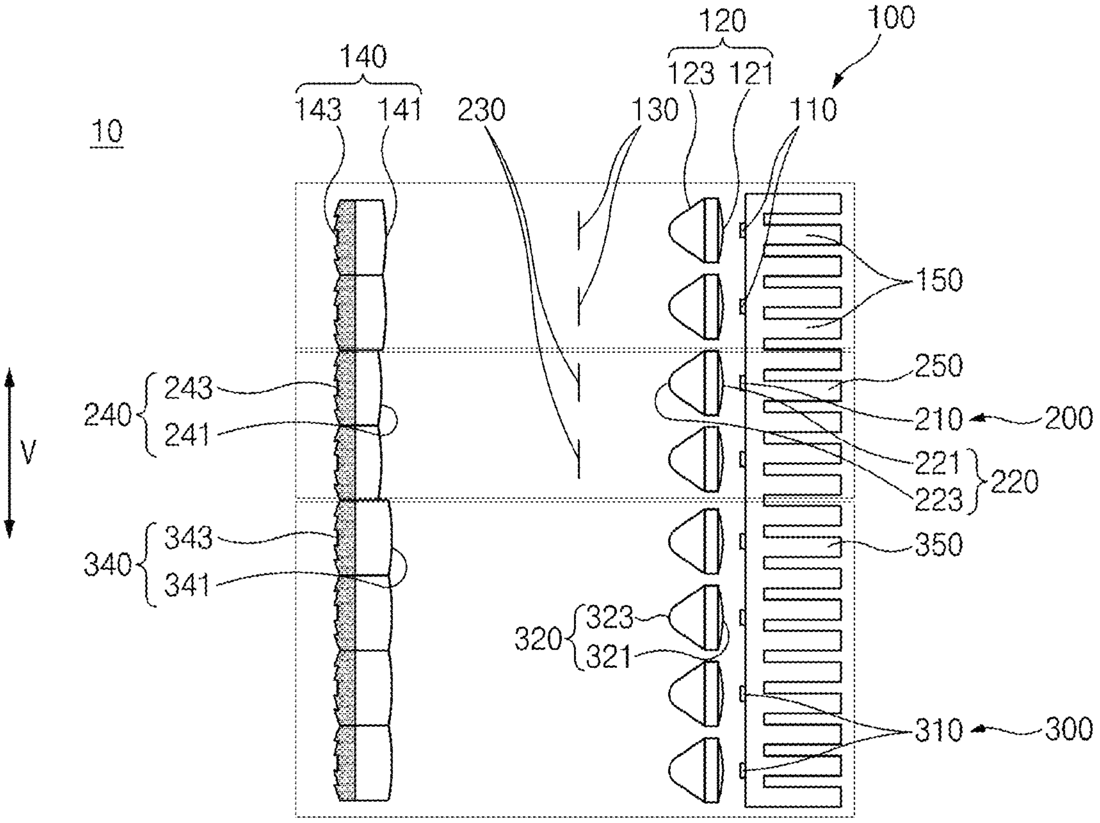
FIG. 2 illustrates the vehicle lamp according to the first embodiment of the present disclosure and illustrates a side surface of the vehicle lamp.
Figure 3:
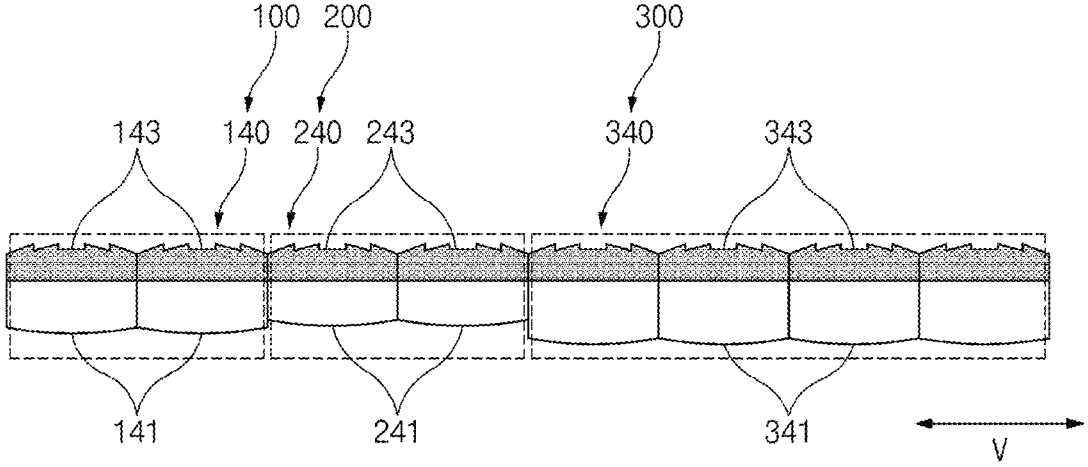
FIG. 3 is a side view illustrating a first output lens part, a second output lens part, and a third output lens part when viewed from one side in a left-right direction according to the first embodiment of the present disclosure.
Figure 4:
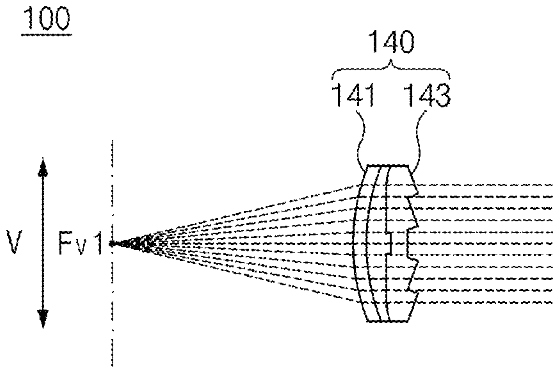
FIG. 4 is a side view illustrating the first output lens part when viewed from the one side in the left-right direction according to the first embodiment of the present disclosure.
Figure 5:
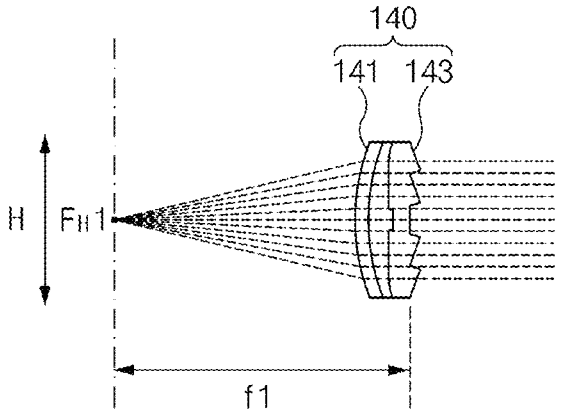
FIG. 5 is a plan view illustrating the first output lens part when viewed from above according to the first embodiment of the present disclosure.
Figure 6:
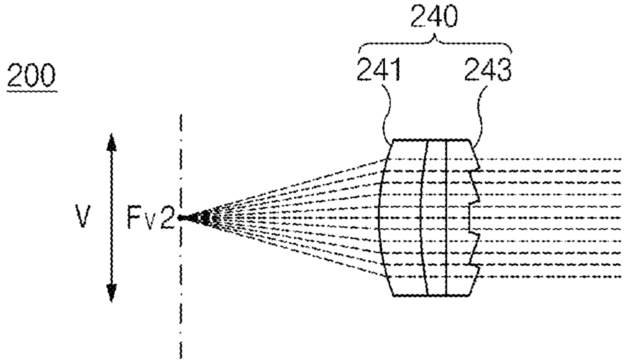
FIG. 6 is a side view illustrating the second output lens part when viewed from the one side in the left-right direction according to the first embodiment of the present disclosure.
Figure 7:
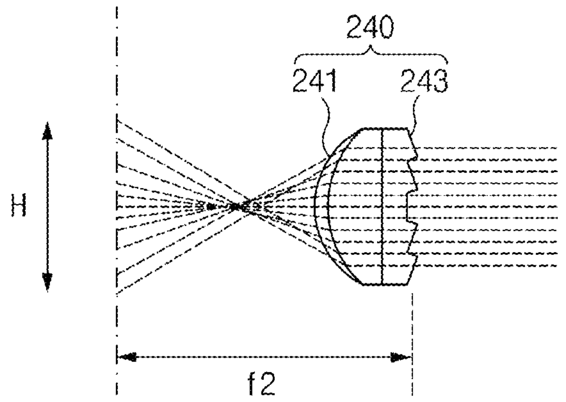
FIG. 7 is a plan view illustrating the second output lens part when viewed from above according to the first embodiment of the present disclosure.
Figure 8:
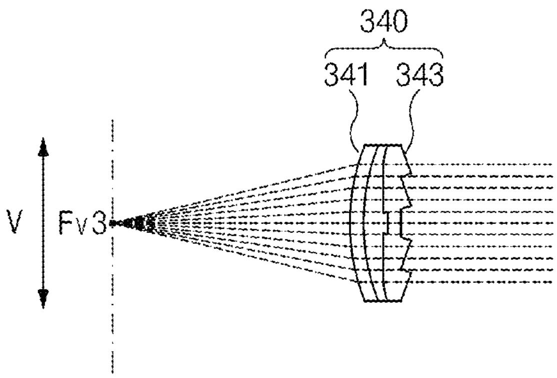
FIG. 8 is a side view illustrating the third output lens part when viewed from the one side in the left-right direction according to the first embodiment of the present disclosure.
Figure 9:
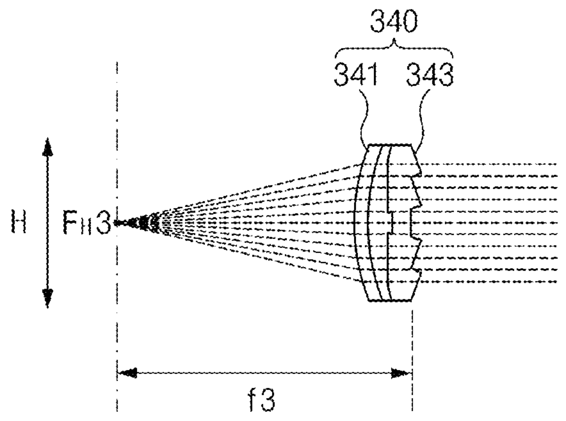
FIG. 9 is a plan view illustrating the third output lens part when viewed from above according to the first embodiment of the present disclosure.

FIG. 1 is a perspective view illustrating a vehicle lamp according to a first embodiment of the present disclosure, FIG. 2 illustrates the vehicle lamp according to the first embodiment of the present disclosure and illustrates a side surface of the vehicle lamp, FIG. 3 is a side view illustrating a first output lens part, a second output lens part, and a third output lens part when viewed from one side in a left-right direction according to the first embodiment of the present disclosure, FIG. 4 is a side view illustrating the first output lens part when viewed from the one side in the left-right direction according to the first embodiment of the present disclosure, FIG. 5 is a plan view illustrating the first output lens part when viewed from above according to the first embodiment of the present disclosure, FIG. 6 is a side view illustrating the second output lens part when viewed from the one side in the left-right direction according to the first embodiment of the present disclosure, FIG. 7 is a plan view illustrating the second output lens part when viewed from above according to the first embodiment of the present disclosure, FIG. 8 is a side view illustrating the third output lens part when viewed from the one side in the left-right direction according to the first embodiment of the present disclosure, and FIG. 9 is a plan view illustrating the third output lens part when viewed from above according to the first embodiment of the present disclosure.

Figure 10:
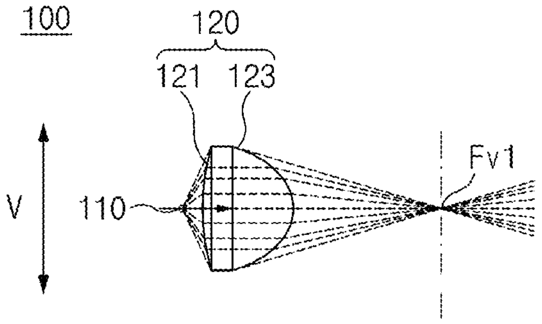
FIG. 10 is a side view illustrating a first condensing lens part when viewed from the one side in the left-right direction according to the first embodiment of the present disclosure.
Figure 11:
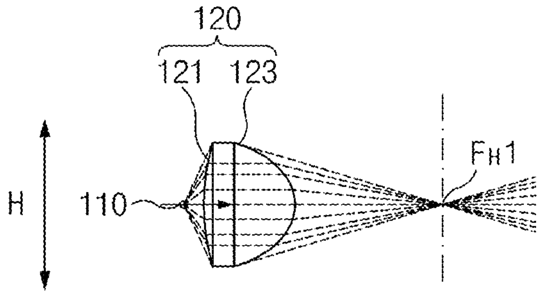
FIG. 11 is a plan view illustrating the first condensing lens part when viewed from above according to the first embodiment of the present disclosure.
Figure 12:
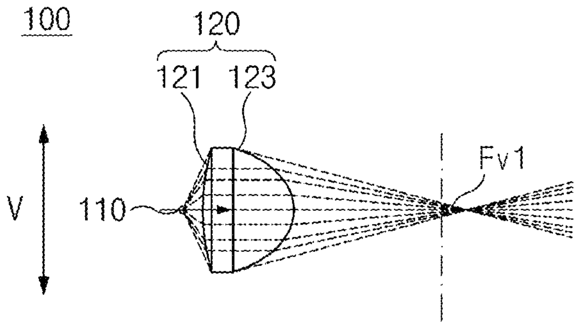
FIG. 12 is a side view illustrating the first condensing lens part when viewed from the one side in the left-right direction according to a second embodiment of the present disclosure.
Figure 13:
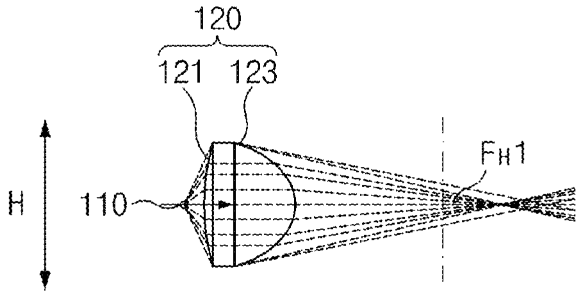
FIG. 13 is a plan view illustrating the first condensing lens part when viewed from above according to the second embodiment of the present disclosure.
Figure 14:
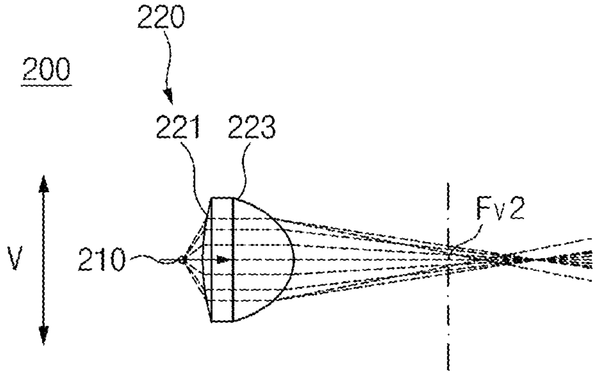
FIG. 14 is a side view illustrating a second condensing lens part when viewed from the one side in the left-right direction according to the first embodiment of the present disclosure.
Figure 15:
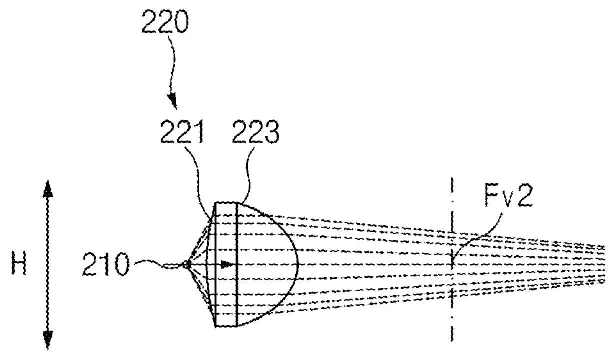
FIG. 15 is a plan view illustrating the second condensing lens part when viewed from above according to the first embodiment of the present disclosure.
Figure 16:
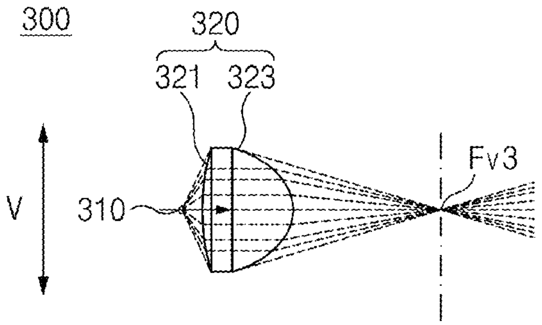
FIG. 16 is a side view illustrating a third condensing lens part when viewed from the one side in the left-right direction according to the first embodiment of the present disclosure.
Figure 17:
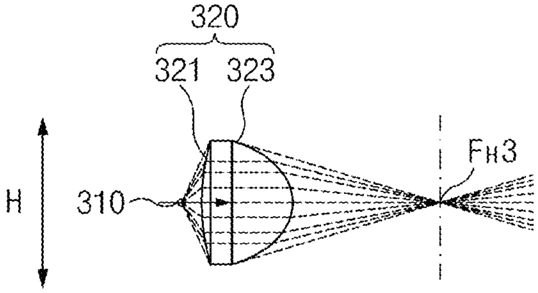
FIG. 17 is a plan view illustrating the third condensing lens part when viewed from above according to the second embodiment of the present disclosure.
Figure 18:
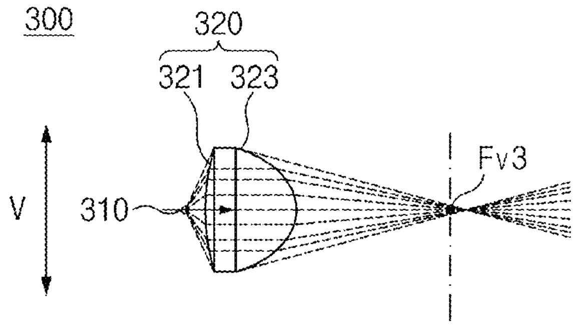
FIG. 18 is a side view illustrating the third condensing lens part when viewed from the one side in the left-right direction according to the second embodiment of the present disclosure.
Figure 19:
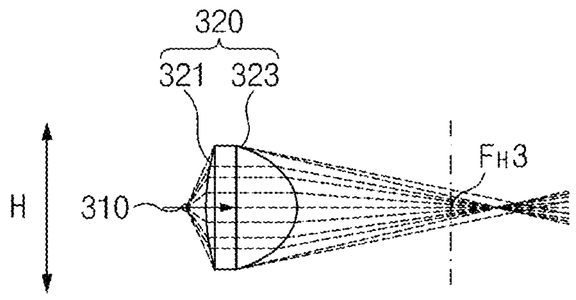
FIG. 19 is a plan view illustrating the third condensing lens part when viewed from above according to the second embodiment of the present disclosure.

FIG. 10 is a side view illustrating a first condensing lens part when viewed from the one side in the left-right direction according to the first embodiment of the present disclosure, FIG. 11 is a plan view illustrating the first condensing lens part when viewed from above according to the first embodiment of the present disclosure, FIG. 12 is a side view illustrating the first condensing lens part when viewed from the one side in the left-right direction according to a second embodiment of the present disclosure, FIG. 13 is a plan view illustrating the first condensing lens part when viewed from above according to the second embodiment of the present disclosure, FIG. 14 is a side view illustrating a second condensing lens part when viewed from the one side in the left-right direction according to the first embodiment of the present disclosure, FIG. 15 is a plan view illustrating the second condensing lens part when viewed from above according to the first embodiment of the present disclosure, FIG. 16 is a side view illustrating a third condensing lens part when viewed from the one side in the left-right direction according to the first embodiment of the present disclosure, FIG. 17 is a plan view illustrating the third condensing lens part when viewed from above according to the second embodiment of the present disclosure, FIG. 18 is a side view illustrating the third condensing lens part when viewed from the one side in the left-right direction according to the second embodiment of the present disclosure, and FIG. 19 is a plan view illustrating the third condensing lens part when viewed from above according to the second embodiment of the present disclosure.

Figure 20:
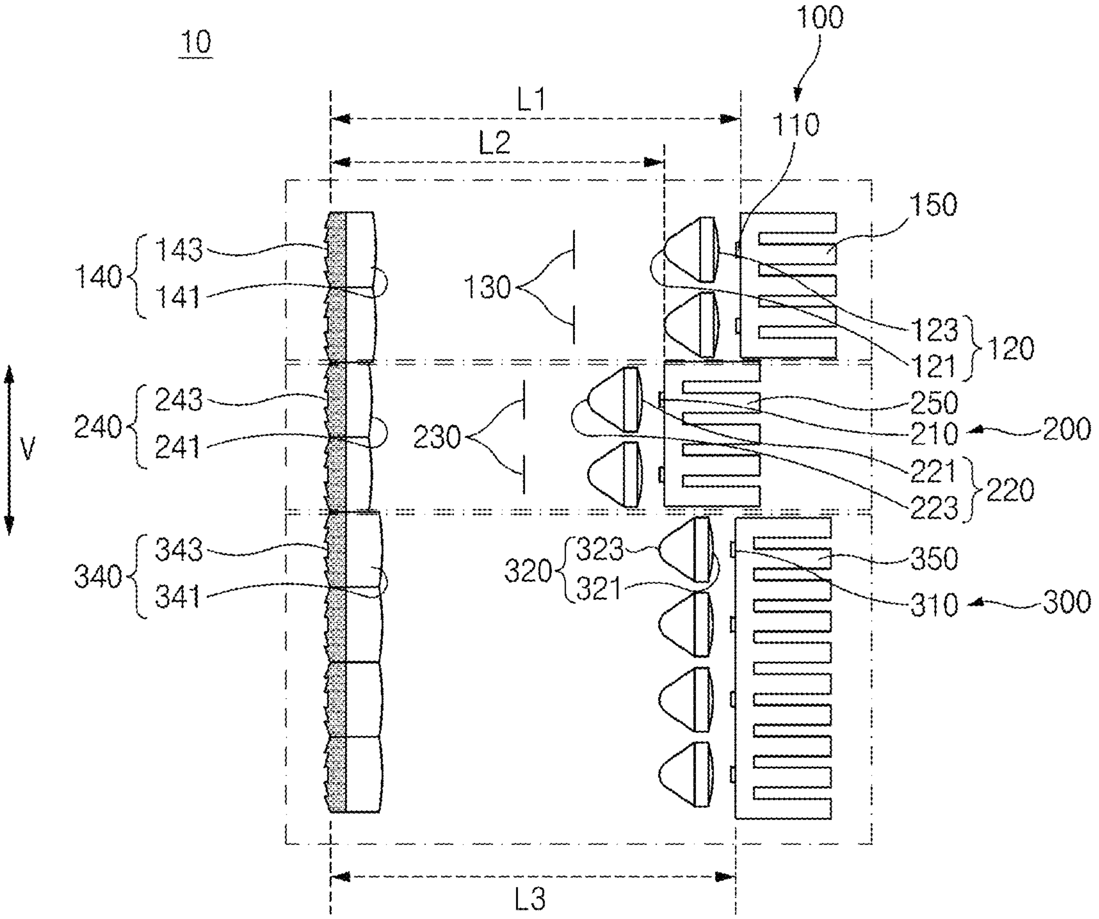
FIG. 20 is a side view illustrating an embodiment in which a first separation distance, a second separation distance, and a third separation distance are different from each other as a modification of the vehicle lamp illustrated in FIG. 2 according to the first embodiment of the present disclosure.
Figure 21:
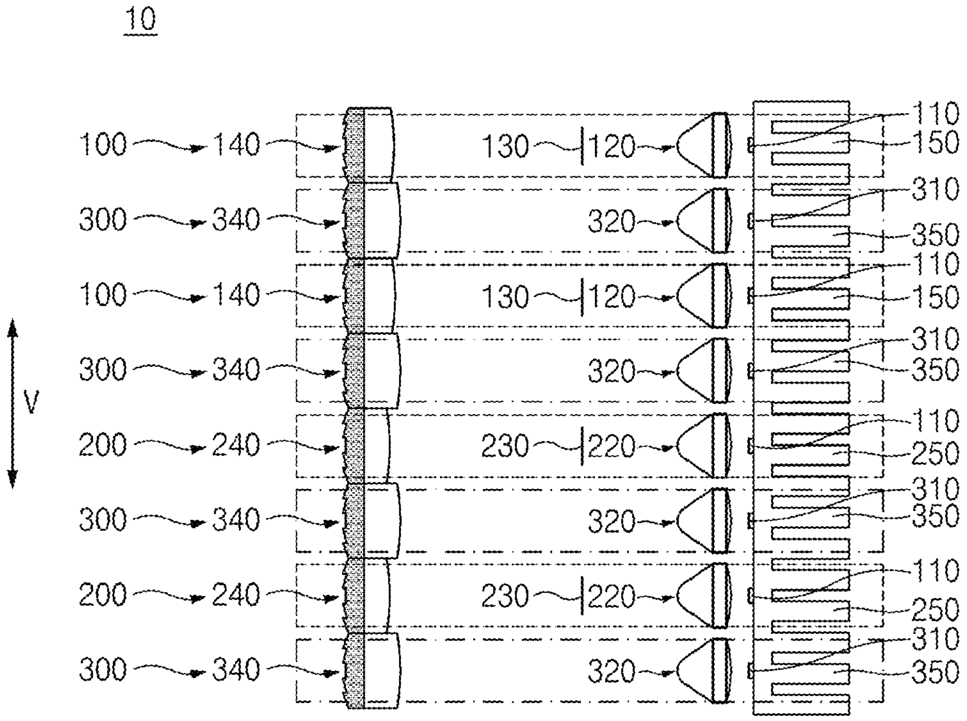
FIG. 21 is a side view illustrating an embodiment in which a third optical module is arranged between a plurality of first optical modules and a plurality of second optical modules as another modification of the vehicle lamp illustrated in FIG. 2 according to the first embodiment of the present disclosure.

FIG. 20 is a side view illustrating an embodiment in which a first separation distance, a second separation distance, and a third separation distance are different from each other as a modification of the vehicle lamp illustrated in FIG. 2 according to the first embodiment of the present disclosure, and FIG. 21 is a side view illustrating an embodiment in which a third optical module is arranged between a plurality of first optical modules and a plurality of second optical modules as another modification of the vehicle lamp illustrated in FIG. 2 according to the first embodiment of the present disclosure.

Figure 22:
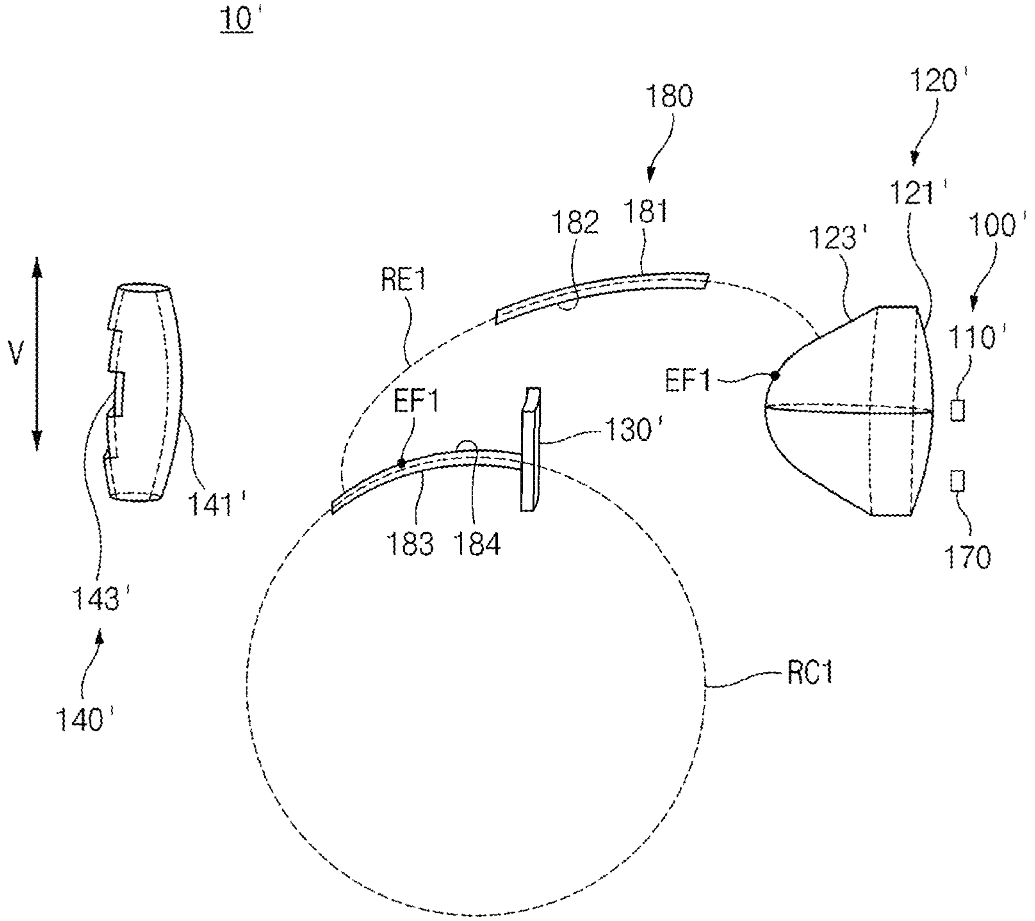
FIG. 22 is a side view illustrating a vehicle lamp according to a third embodiment of the present disclosure and illustrating the first optical module when viewed from the one side in the left-right direction.
Figure 23:
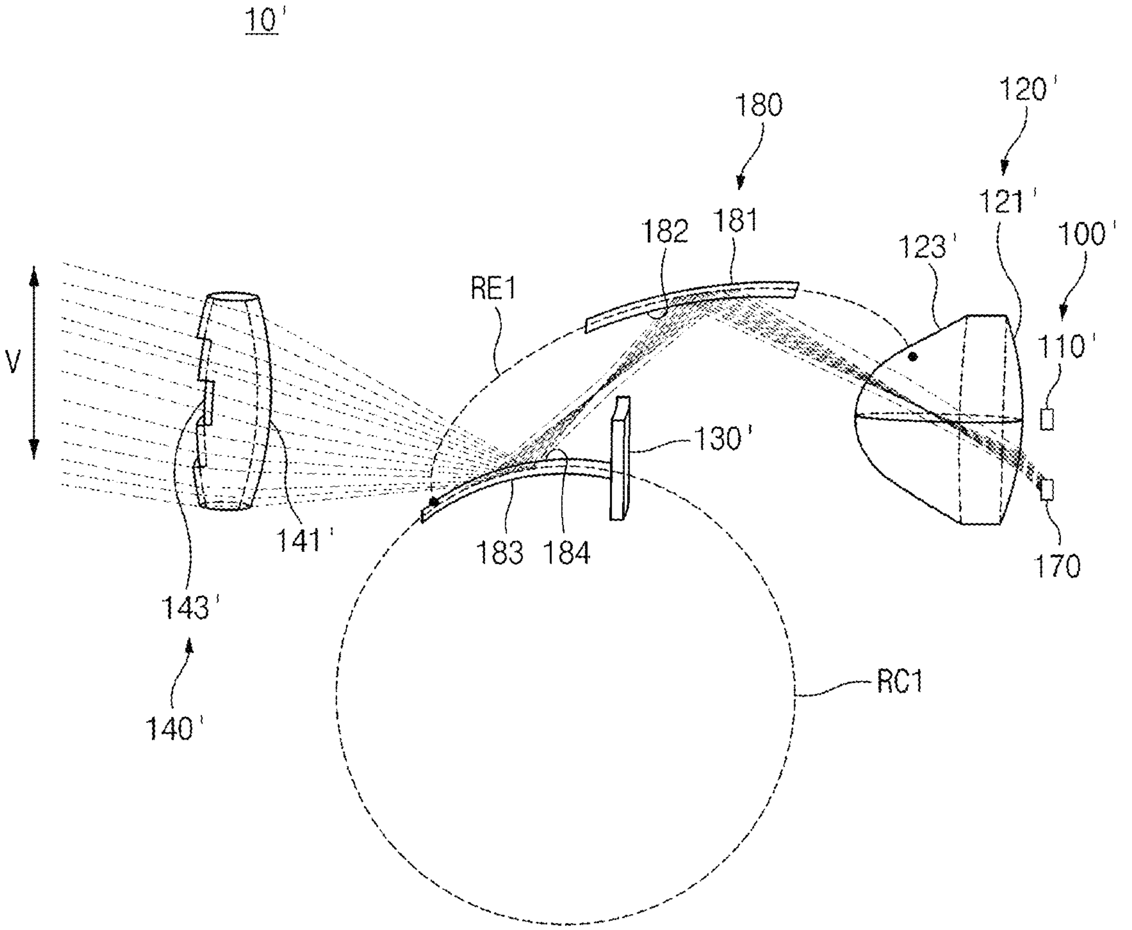
FIG. 23 is a view illustrating the vehicle lamp according to the third embodiment of the present disclosure and additionally illustrating a movement path of a light beam emitted from a first sub-light source part in FIG. 22.
Figure 24:
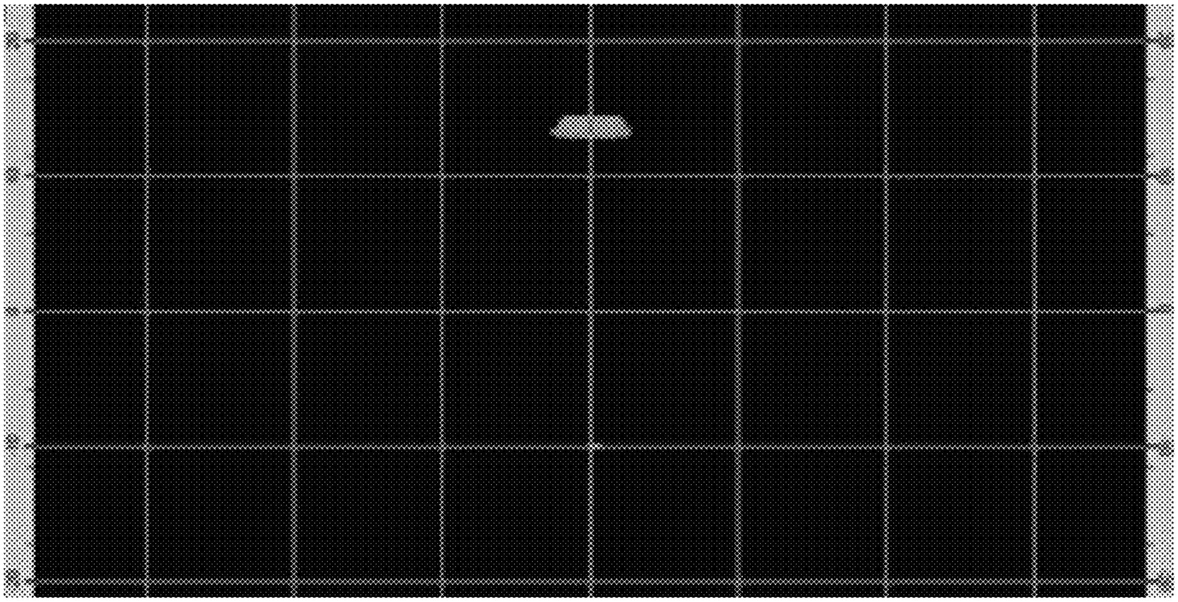
FIG. 24 is a view illustrating a first sub-light distribution pattern by the vehicle lamp according to the third embodiment of the present disclosure.
Figure 25:
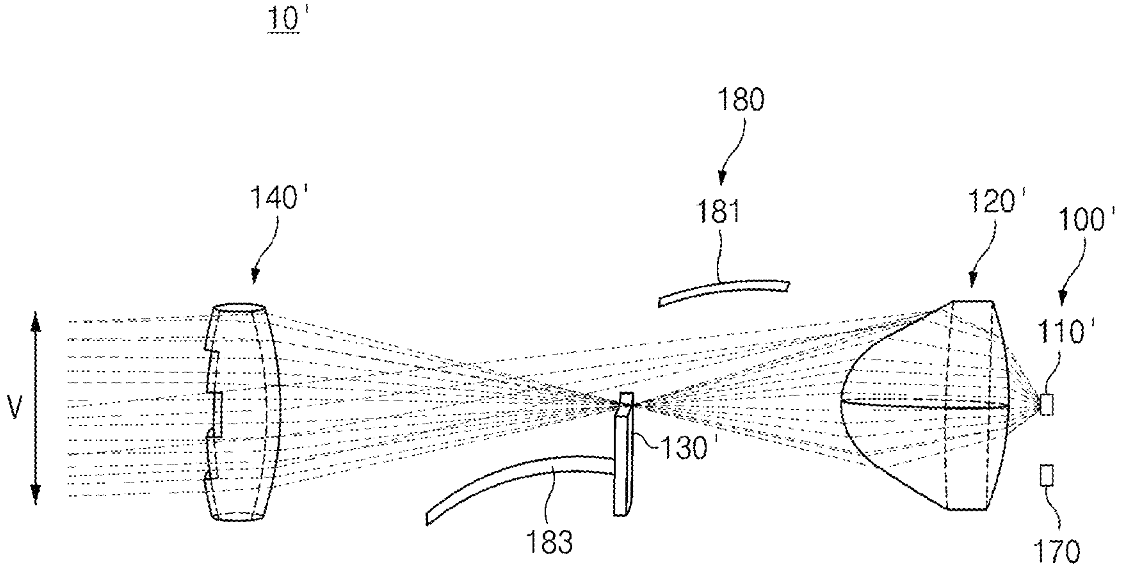
FIG. 25 is a view illustrating the vehicle lamp according to the third embodiment of the present disclosure and additionally illustrating a movement path of a light beam emitted from a first light source part in FIG. 22.
Figure 26:
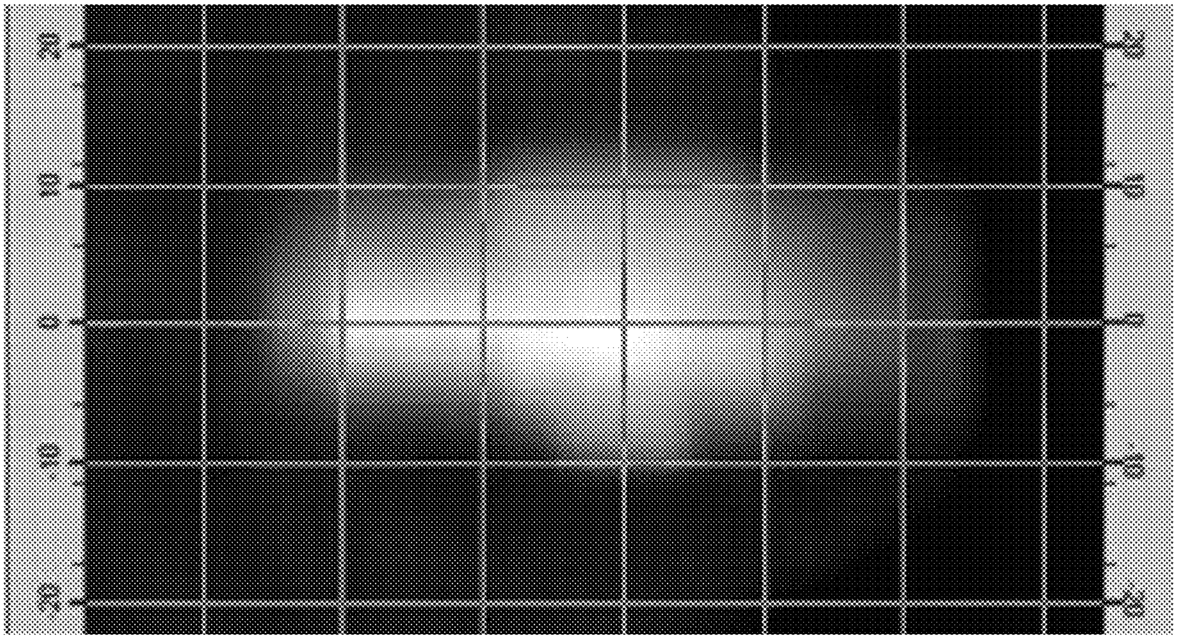
FIG. 26 is a view illustrating a main light distribution pattern by a second lamp unit illustrated in FIG. 1.

FIG. 22 is a side view illustrating a vehicle lamp according to a third embodiment of the present disclosure and illustrating the first optical module when viewed from the one side in the left-right direction, FIG. 23 is a view illustrating the vehicle lamp according to the third embodiment of the present disclosure and additionally illustrating a movement path of a light beam emitted from a first sub-light source part in FIG. 22, FIG. 24 is a view illustrating a first sub-light distribution pattern by the vehicle lamp according to the third embodiment of the present disclosure, FIG. 25 is a view illustrating the vehicle lamp according to the third embodiment of the present disclosure and additionally illustrating a movement path of a light beam emitted from a first light source part in FIG. 22, and FIG. 26 is a view illustrating a main light distribution pattern by a second lamp unit illustrated in FIG. 1.

Figure 27:
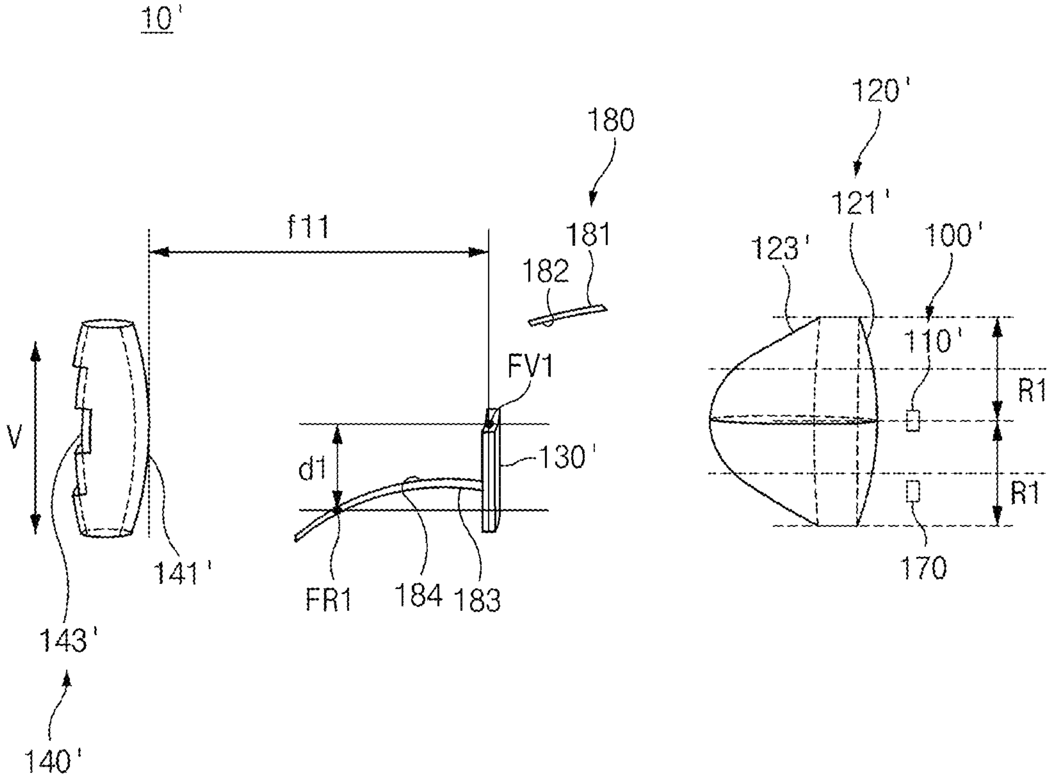
FIG. 27 is a side view illustrating the first optical module when viewed from the one side in the left-right direction according to the third embodiment of the present disclosure.
Figure 28:
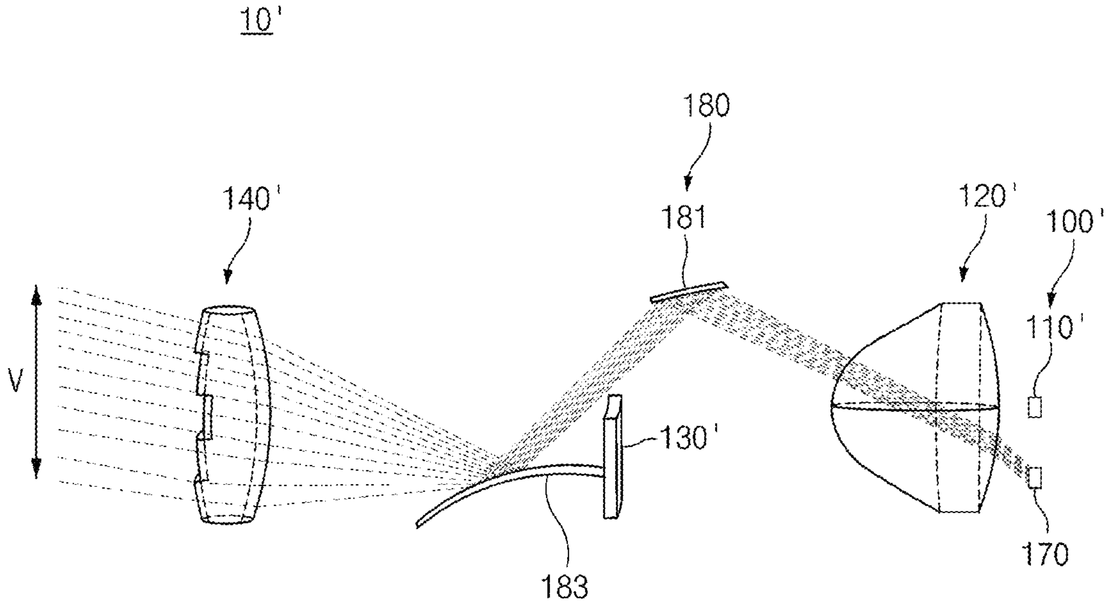
FIG. 28 is a view additionally illustrating a movement path of the light beam emitted from the first sub-light source part in FIG. 27.
Figure 29:
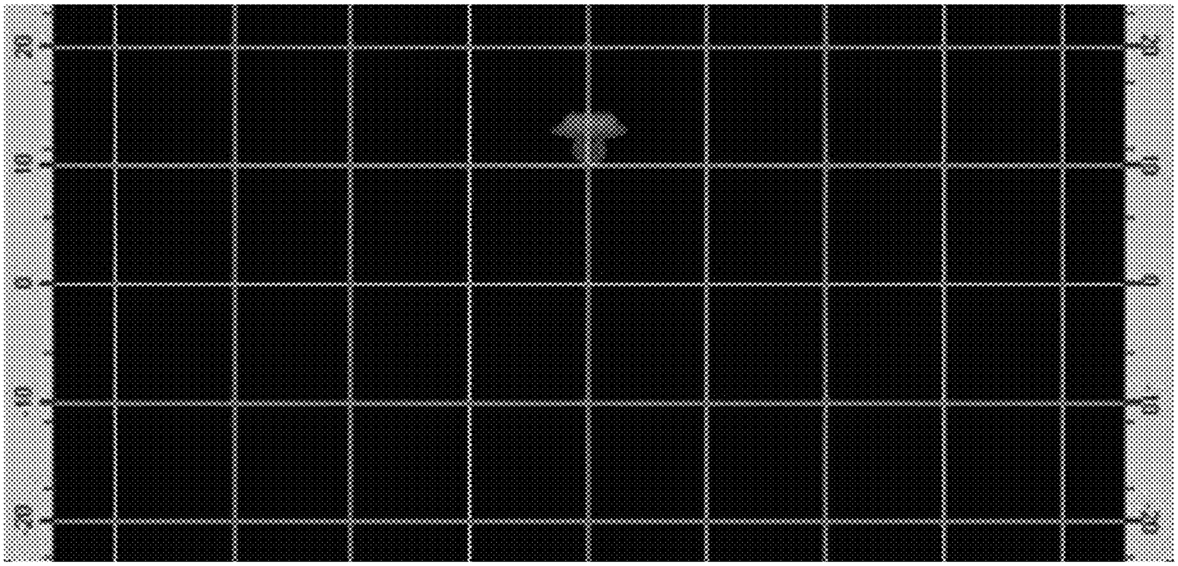
FIG. 29 is a view illustrating the first sub-light distribution pattern by the vehicle lamp according to the third embodiment of the present disclosure.
Figure 30:
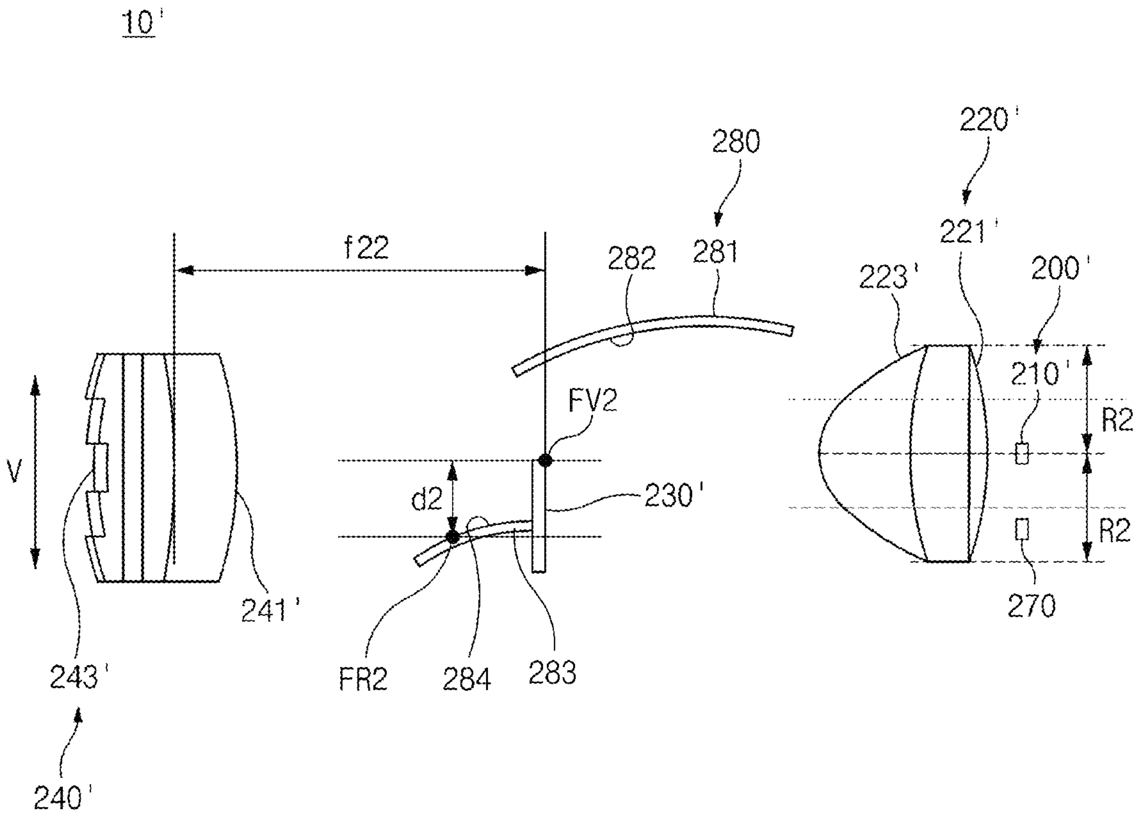
FIG. 30 is a side view illustrating the second optical module when viewed from the one side in the left-right direction according to the third embodiment of the present disclosure.
Figure 31:
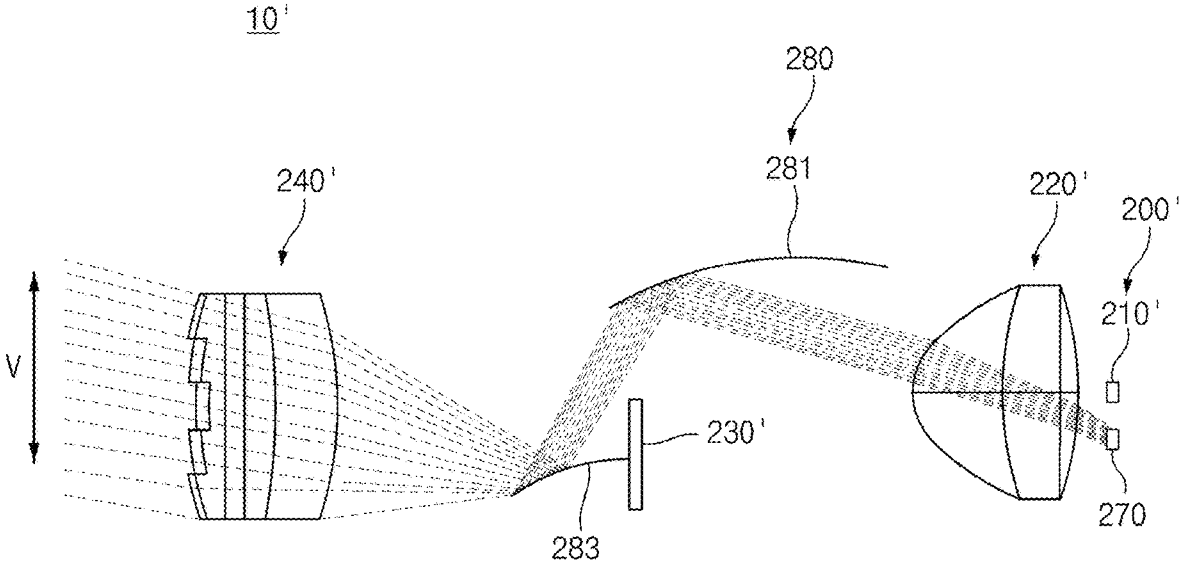
FIG. 31 is a view additionally illustrating a movement path of a light beam emitted from a second sub-light source part in FIG. 30.
Figure 32:
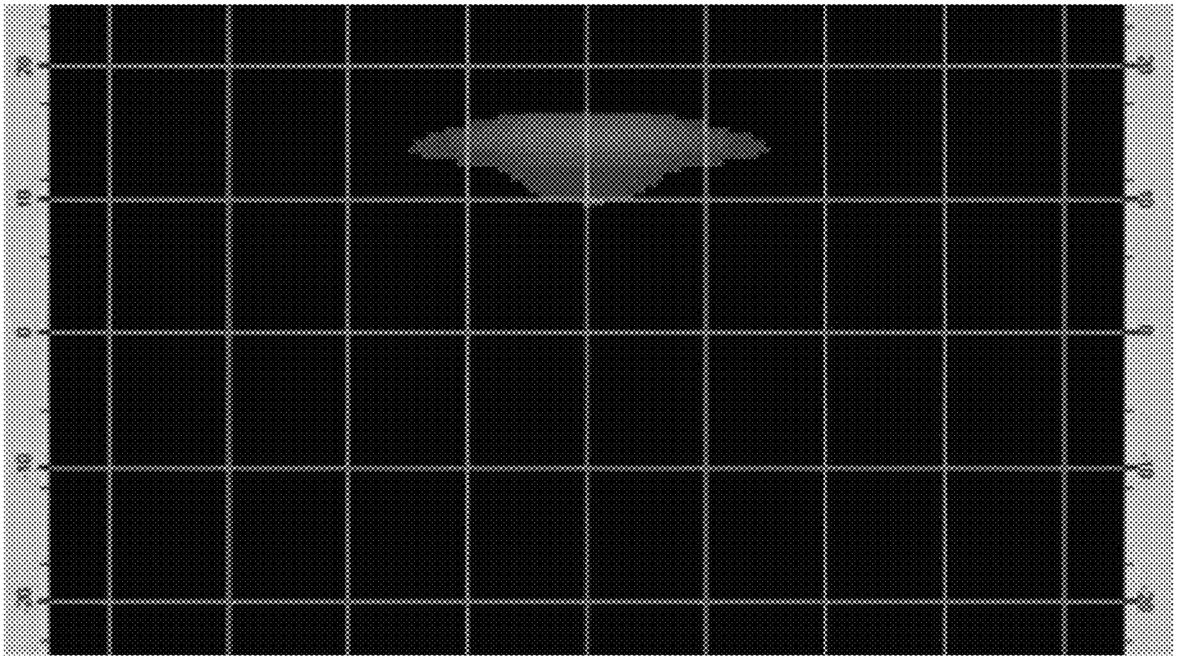
FIG. 32 is a view illustrating a second sub-light distribution pattern by the vehicle lamp according to the third embodiment of the present disclosure.
Figure 33:
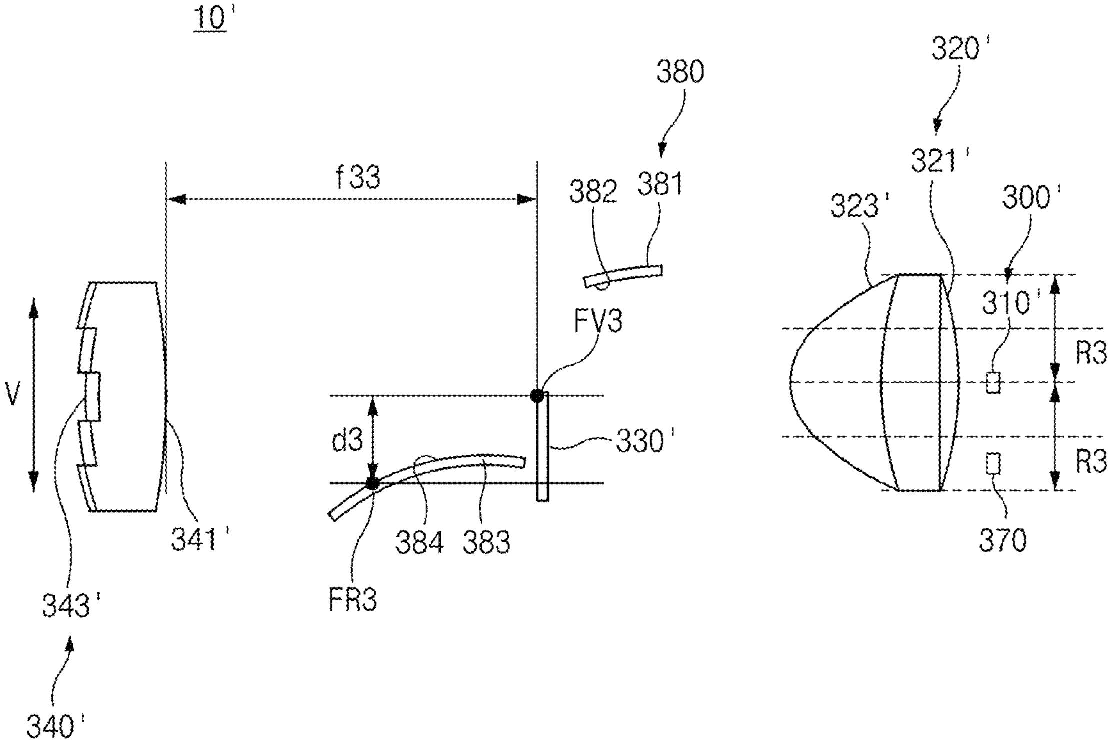
FIG. 33 is a side view illustrating the third optical module when viewed from the one side in the left-right direction according to the third embodiment of the present disclosure.
Figure 34:
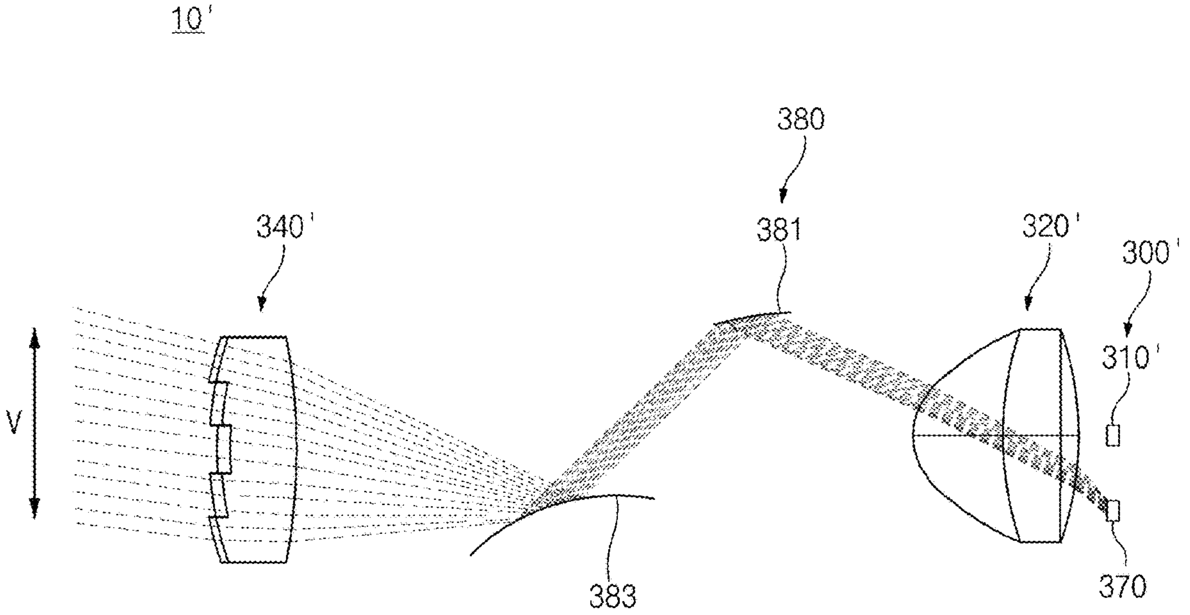
FIG. 34 is the one view additionally illustrating a movement path of a light beam emitted from a third sub-light source part in FIG. 33.
Figure 35:
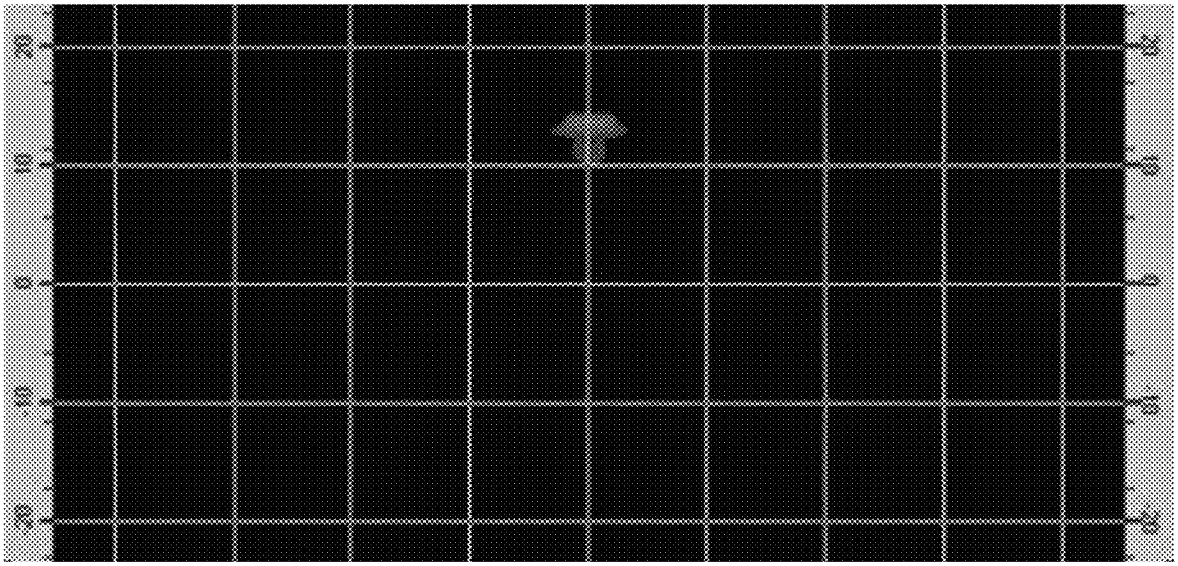
FIG. 35 is a view illustrating a third sub-light distribution pattern by the vehicle lamp according to the third embodiment of the present disclosure.

FIG. 27 is a side view illustrating the first optical module when viewed from the one side in the left-right direction according to the third embodiment of the present disclosure, FIG. 28 is a view additionally illustrating a movement path of the light beam emitted from the first sub-light source part in FIG. 27, FIG. 29 is a view illustrating the first sub-light distribution pattern by the vehicle lamp according to the third embodiment of the present disclosure, FIG. 30 is a side view illustrating the second optical module when viewed from the one side in the left-right direction according to the third embodiment of the present disclosure, FIG. 31 is a view additionally illustrating a movement path of a light beam emitted from a second sub-light source part in FIG. 30, FIG. 32 is a view illustrating a second sub-light distribution pattern by the vehicle lamp according to the third embodiment of the present disclosure, FIG. 33 is a side view illustrating the third optical module when viewed from the one side in the left-right direction according to the third embodiment of the present disclosure, FIG. 34 is the one view additionally illustrating a movement path of a light beam emitted from a third sub-light source part in FIG. 33, and FIG. 35 is a view illustrating a third sub-light distribution pattern by the vehicle lamp according to the third embodiment of the present disclosure.

Referring to FIGS. 1 to 21, a vehicle lamp 10 according to an embodiment of the present disclosure includes a first optical module 100, a second optical module 200, and a third optical module 300. The vehicle lamp 10 according to the embodiment of the present disclosure may be used for lighting functions (for example, head lamps or fog lamps) or signal functions (for example, turn signal lamps, tail lamps, brake lamps, and side markers), and the present disclosure is not restricted or limited by the use. For example, the vehicle lamp 10 according to the embodiment of the present disclosure may be used as a head lamp of a vehicle mounted on a front left side and a front right side of the vehicle and may be a head lamp that may irradiate a low beam and a high beam simultaneously or individually.

The first optical module 100 is provided to form a first light distribution pattern and includes a first light source part 110 and a first output lens part 140 that outputs a light beam input from the first light source part 110. Further, the second optical module 200 is provided to form a second light distribution pattern and includes a second light source part 210 and a second output lens part 240 that outputs a light beam input from the second light source part 210. Further, the third optical module 300 is provided to form a third light distribution pattern and includes a third light source part 310 and a third output lens part 340 that outputs a light beam input from the third light source part 310.

Here, the first optical module 100, the second optical module 200, and the third optical module 300 may be arranged in a vertical direction, and the first output lens part 140, the second output lens part 240, and the third output lens part 340 may be arranged in the vertical direction and may be formed integrally. In FIGS. 1 to 21, "V" denotes a vertical direction (up-down direction) with respect to the ground, and "H" denotes a horizontal direction (left-right direction).

Meanwhile, the first light distribution pattern and the second light distribution pattern may overlap to form a low beam light distribution pattern. Further, the third light distribution pattern may be provided to form a high beam light distribution pattern.

For example, the first light distribution pattern may be a hot zone light distribution pattern for securing a view of a central area on a front side of the vehicle among the low beam light distribution pattern. Further, the second light distribution pattern may be a wide zone light distribution pattern for securing a view of a surrounding area on the front side of the vehicle and securing visibility when turning among the low beam light distribution pattern.

Further, the third light distribution pattern may be a high beam light distribution pattern that is a high beam capable of irradiating a long distance in front of the vehicle.

In detail, the first optical module 100 is provided to form the first light distribution pattern and includes the first light source part 110, the first output lens part 140, and a first condensing lens part 120.

Various light emitting elements or devices may be used as the first light source part 110. For example, the first light source part 110 may include a light source and a substrate. For example, the light source may be provided as a light emitting diode (hereinafter, referred to as an LED), and the substrate may be a printed circuit board (PCB). However, a configuration of the first light source part 110 is not limited thereto.

The first output lens part 140 may be provided to output the light beam input from the first light source part 110. The first output lens part 140 may be provided to transmit the light beam irradiated from the first light source part 110 to form the first light distribution pattern.

The first condensing lens part 120 may be provided to condense the light beam emitted from the first light source part 110. The light beam irradiated from the first light source part 110 may be condensed by the first condensing lens part 120, pass through the first output lens part 140, and then be output to the front side.

The second optical module 200 is provided to form the second light distribution pattern and includes the second light source part 210, the second output lens part 240, and a second condensing lens part 220.

The second light source part 210 may include, for example, a light source and a substrate. For example, the light source may be provided as a light emitting diode (hereinafter, referred to as an LED), and the substrate may be a printed circuit board (PCB). However, a configuration of the second light source part 210 is not limited thereto.

The second output lens part 240 may be provided to output the light beam input from the second light source part 210. The second output lens part 240 may be provided to form the second light distribution pattern using the light beam emitted from the second light source part 210.

The second condensing lens part 220 may be provided to condense the light beam emitted from the second light source part 210. The light beam irradiated from the second light source part 210 may be condensed by the second condensing lens part 220, pass through the second output lens part 240, and then be output to the front side.

The third optical module 300 is provided to form the third light distribution pattern and includes the third light source part 310, the third output lens part 340, and a third condensing lens part 320.

The third light source part 310 may include, for example, a light source and a substrate. For example, the light source may be provided as a light emitting diode (hereinafter, referred to as an LED), and the substrate may be a printed circuit board (PCB). However, a configuration of the third light source part 310 is not limited thereto.

The third output lens part 340 may be provided to output the light beam input from the third light source part 310. The third output lens part 340 may form the third light distribution pattern using the light beam emitted from the third light source part 310.

The third condensing lens part 320 may be provided to condense the light beam emitted from the third light source part 310. The light beam irradiated from the third light source part 310 may be condensed by the third condensing lens part 320, pass through the third output lens part 340, and then be output to the front side.

As described above, the first optical module 100, the second optical module 200, and the third optical module 300 are arranged in the vertical direction, and the first output lens part 140, the second output lens part 240, and the third output lens part 340 may be integrally formed in the vertical direction.

In detail, the vehicle lamp 10 according to the present disclosure is an optical system that extends in the vertical direction and may implement both the high beam light distribution pattern and the low beam light distribution pattern. According to the present disclosure, the first output lens part 140, the second output lens part 240, and the third output lens part 340 arranged on the front side are integrally formed, and thus in a lighted state, a lighting image having a continuous line image without a disconnection sense may formed.

Accordingly, differentiation in design of the lamp may be secured, thereby increasing the competitiveness of a product.

Meanwhile, the first optical module 100 may further include a first shield part 130 provided between the first condensing lens part 120 and the first output lens part 140 to block a portion of the light beam. Further, the second optical module 200 may further include a second shield part 230 provided between the second condensing lens part 220 and the second output lens part 240 to block a portion of the light beam.

The first shield part 130 and the second shield part 230 may include stepped cutoff areas having a shape corresponding to a cutoff line of the low beam light distribution pattern.

In detail, the first shield part 130 may have the cutoff area at an upper end thereof to restrict the light beam irradiated from the first light source part 110 so as to form the cutoff line in the first light distribution pattern. Further, the second shield part 230 may have the cutoff area at an upper end thereof to restrict the light beam irradiated from the second light source part 210 so as to form the cutoff line in the second light distribution pattern.

Meanwhile, the first optical module 100 may further include a first heat dissipation part 150. The first heat dissipation part 150 may be equipped with the first light source part 110 and dissipate heat generated in the first light source part 110. The first light source part 110 may include one or a plurality of light sources, and when there are the plurality of light sources, the first light source part 110 may be arranged on a front surface of the first heat dissipation part 150 in the vertical direction.

The second optical module 200 may further include a second heat dissipation part 250. The second heat dissipation part 250 may be equipped with the second light source part 210 and dissipate heat generated in the second light source part 210. The second light source part 210 may include one or a plurality of light sources, and when there are the plurality of light sources, the second light source part 210 may be arranged on a front surface of the second heat dissipation part 250 in the vertical direction.

The third optical module 300 may further include a third heat dissipation part 350. The third heat dissipation part 350 may be equipped with the third light source part 310 and dissipate heat generated in the third light source part 310. The third light source part 310 may include one or a plurality of light sources, and when there are the plurality of light sources, the third light source part 310 may be arranged on a front surface of the third heat dissipation part 350 in the vertical direction.

Here, the first heat dissipation part 150, the second heat dissipation part 250, and the third heat dissipation part 350 may be arranged in the vertical direction and integrally formed. Accordingly, the present disclosure may implement an optical system extending in the vertical direction to form a vertical lighting image.

As described above, this may be enabled by the first condensing lens part 120, the second condensing lens part 220, and the third condensing lens part 320 that condense the forwardly irradiated light beam. For example, in the case of the related art in which a method of condensing the light beam irradiated from the light source and allowing the condensed light beam to face the front side uses an ellipse reflective surface structure, the light source irradiates the light beam to an upward light rather than a forward light, and in this case, a vertically long type heat sink cannot be used for the first light source part, the second light source part, and a heat dissipation member in which the second light source part is installed.

According to the present disclosure, the first condensing lens part 120, the second condensing lens part 220, and the third condensing lens part 320, which serve as both a reflective lens and a condensing lens, are provided, and thus the light beam irradiated from the light source to a front side of a car line may be condensed and face the front side.

Accordingly, according to the present disclosure, as illustrated, a type may be applied in which the first heat dissipation part 150, the second heat dissipation part 250, and the third heat dissipation part 350 may extend in the vertical direction and may be formed integrally. Further, heat dissipation fins provided in the first heat dissipation part 150, the second heat dissipation part 250, and the third heat dissipation part 350 may be designed in a direction of the car line. Here, the car line refers to a front-rear line of the vehicle with respect to a traveling direction of the vehicle.

However, the present disclosure is not limited to a case in which the first heat dissipation part 150, the second heat dissipation part 250, and the third heat dissipation part 350 are integrally formed, and the first heat dissipation part 150, the second heat dissipation part 250, and the third heat dissipation part 350 may be arranged in the vertical direction, separately formed, and then assembled (see FIG. 20).

The first output lens part 140 may include a first input surface 141 into which a light beam is input and a first output surface 143 from which a light beam is output, the second output lens part 240 may include a second input surface 241 into which a light beam is input and a second output surface 243 from which a light beam is output, and the third output lens part 340 may include a third input surface 341 into which a light beam is input and a third output surface 343 from which a light beam is output.

Here, the first output surface 143, the second output surface 243, and the third output surface 343 may be provided as a multi-facet lens (MFL). Accordingly, the vehicle lamp 10 may increase light diffusion efficiency and implement surface light emission.

Further, the first output surface 143, the second output surface 243, and the third output surface 343 may be formed in shapes corresponding to each other.

In detail, the first optical module 100, the second optical module 200, and the third optical module 300 may be provided in plurality. For example, as in the first embodiment illustrated in FIG. 3, when two first optical modules 100 and two second optical modules 200 are provided and four third optical modules 300 are provided, the first output lens part 140, the second output lens part 240, and the third output lens part 340 may be formed in a form in which eight lenses are integrally formed.

In this case, when the first output surface 143, the second output surface 243, and the third output surface 343 are all formed in different shapes, a difference sense may be felt for each module when the lamp is not lighted, and a disconnection sense may occur when the lamp is lighted.

Accordingly, in the first embodiment of the present disclosure, the first output surface 143, the second output surface 243, and the third output surface 343 may have shapes corresponding to each other. Here, the fact that the first output surface 143, the second output surface 243, and the third output surface 343 have shapes corresponding to each other means that the first output surface 143, the second output surface 243, and the third output surface 343 are formed to be identical to each other or formed in extremely similar shapes to the extent that those skilled in the art to which the present disclosure pertains may determine that the first output surface 143, the second output surface 243, and the third output surface 343 have substantially the same shape.

In this case, a disconnection sense between the optical modules may be minimized when the lamp is lighted or is not lighted. Further, the first input surface 141, the second input surface 241, and the third input surface 341 are differently designed, and thus light distribution patterns having different light distribution characteristics may be implemented in the respective optical modules.

In detail, the first input surface 141, the second input surface 241, and the third input surface 341 may have different shapes.

Accordingly, optical characteristics of the respective optical modules may be different from each other. A characteristic difference, such as a focus, of the first output lens part 140, the second output lens part 240, and the third output lens part 340, which will be described below, may be caused by a shape difference between the first input surface 141, the second input surface 241, and the third input surface 341.

Referring to FIGS. 4 and 5, in the first output lens part 140, a vertical focal point FV1 and a horizontal focal point FH1 may be formed to be the same.

For example, a curvature of the first input surface 141 in a horizontal direction "H" and a curvature of the first input surface 141 in a vertical direction "V" may be the same. As an example, the first input surface 141 may be formed in an aspherical surface, but the present disclosure is not limited thereto. In this way, the first output lens part 140 is designed such that the curvatures thereof in the horizontal direction "H" and the vertical direction "V" have the same shape, and thus a position of the horizontal focal point and a position of the vertical focal point may be the same.

As an example, a lens focal distance f1 that is a distance from the vertical focal point FV1 or the horizontal focal point FH1 to the first output surface 143 of the first output lens part 140 may be in a range of 35 mm to 45 mm, but the lens focal distance f1 is not limited thereto.

Meanwhile, referring to FIGS. 6 and 7, in the second output lens part 240, a vertical focal point FV2 and a horizontal focal point FH2 may be different from each other.

For example, a curvature of the second input surface 241 in a horizontal direction and a curvature of the second input surface 241 in a vertical direction may be different from each other. Accordingly, the positions or optical characteristics of the horizontal focal point and the vertical focal point may be made different.

The vertical focal point FV2 of the second output lens part 240 may be the same as the vertical focal point FV1 of the first output lens part 140 or smaller than the vertical focal point FV1 of the first output lens part 140. That is, a lens focal distance f2 that is a distance from the vertical focal point FV2 to the second output surface 243 of the second output lens part 240 may be equal to or less than the lens focal distance f1 of the first output lens part 140.

As an example, the vertical focal point FV2 of the second output lens part 240 may be in a range of 30 mm to 45 mm, but the present disclosure is not limited thereto.

A focal point may be formed in the second output lens part 240 when a light beam passing through the second output lens part 240 is viewed in the vertical direction "V." Further, when the light beam passing through the second output lens part 240 is viewed in the horizontal direction "H," the light beam may be defocused.

In detail, the second output lens part 240 is designed such that the curvature of the second input surface 241 in the vertical direction and the curvature of the second input surface 241 in the horizontal direction are different from each other. Thus, only the vertical focal point FV2 may be formed, and the horizontal focal point FH2 may not be formed. Here, as described above, the vertical focal point FV2 of the second output lens part 240 may be the same as the vertical focal point FV1 of the first output lens part 140 or may be different from the vertical focal point FV1.

Further, when the light beam passing through the second output lens part 240 is viewed from the upper side, the passing light beams do not form a single focal point, and accordingly, the light distribution pattern may have a relatively blurry diffused shape. Accordingly, as a boundary between the light distribution patterns overlapping each other is somewhat blurry, a difference sense between the light distribution patterns may be minimized, and uniformity of the entire low beam light distribution pattern may be secured.

The curvature of the second input surface 241 in the horizontal direction may be formed greater than the curvature of the first input surface 141 in the horizontal direction.

Accordingly, the light beam introduced into the second input surface 241 with respect to the horizontal direction "H" may intersect at a position closer to the second output surface 243 than a virtual line obtained by extending the focal point FV1 of the first input surface 141 in the left-right direction and then may pass through the second output lens part 240. Accordingly, the second light distribution pattern formed by the second optical module may be formed in a wider range than the first light distribution pattern.

In the third output lens part 340, a vertical focal point FV3 and a horizontal focal point FH3 may be the same.

For example, a curvature of the third input surface 341 in the horizontal direction and a curvature of the third input surface 341 in the vertical direction may be same. In this way, the third output lens part 340 is designed such that the curvature of the third input surface 341 in the horizontal direction and the curvature of the third input surface 341 in the vertical direction are the same, and thus a position of the horizontal focal point and a position of the vertical focal point may be the same.

As an example, a lens focal distance f3 that is a distance from the vertical focal point FV3 or the horizontal focal point FH3 to the third output surface 343 of the third output lens part 340 may be in a range of 30 mm to 40 mm, but the lens focal distance f3 is not limited thereto.

The focal point of the third output lens part 340 may be the same as the focal point of the first output lens part 140 or smaller than the focal point of the first output lens part 140. In detail, the lens focal distance f3 that is a distance from the vertical focal point FV3 to the third output surface 343 of the third output lens part 340 may be equal to or less than the lens focal distance f1 of the first output lens part 140.

Meanwhile, as described above, the first optical module 100, the second optical module 200, and the third optical module 300 are arranged in the vertical direction. Further, in the first condensing lens part 120, the second condensing lens part 220, and the third condensing lens part 320, a curvature of a light input surface that is a surface into which a light beam is input may be smaller than a curvature of a light output surface that is a surface from which a light beam is output.

In detail, the lamp according to the related art may condense the light beam irradiated from the light source using a combination of a collimator and a condensing lens, but in the present disclosure, one refractive lens may serve to condense the light beam. This may be implemented by the first condensing lens part 120, the second condensing lens part 220, and the third condensing lens part 320.

Accordingly, according to the present disclosure, the plurality of condensing lens parts and the plurality of output lens parts may be arranged in the vertical direction, and the light beam irradiated from the light source to the front side of the car line may be condensed and face the front side. Accordingly, according to the present disclosure, as illustrated, a type may be possible in which the first heat dissipation part 150, the second heat dissipation part 250, and the third heat dissipation part 350 may extend in the vertical direction and may be formed integrally.

The first condensing lens part 120 may include a first light input surface 121 into which a light beam is input and a first light output surface 123 from which a light beam is output.

The first light input surface 121 and the first light output surface 123 may be formed in convex curved surfaces, and a radius of curvature of the first light input surface 121 may be greater than a radius of curvature of the first light output surface 123. That is, the curvature of the first light input surface 121 may be formed to be smaller than the curvature of the first light output surface 123.

The second condensing lens part 220 may include a second light input surface 221 into which a light beam is input and a second light output surface 223 from which a light beam is output.

The second light input surface 221 and the second light output surface 223 may be formed in convex curved surfaces, and a radius of curvature of the second light input surface 221 may be greater than a radius of curvature of the second light output surface 223. That is, the curvature of the second light input surface 221 may be formed to be smaller than the curvature of the second light output surface 223.

The third condensing lens part 320 may include a third light input surface 321 into which a light beam is input and a third light output surface 323 from which a light beam is output.

The third light input surface 321 and the third light output surface 323 may be formed in convex curved surfaces, and a radius of curvature of the third light input surface 321 may be greater than a radius of curvature of the third light output surface 323. That is, the curvature of the third light input surface 321 may be formed to be smaller than the curvature of the third light output surface 323.

Referring to FIGS. 10 and 11, in the first condensing lens part 120, a vertical focal point and a horizontal focal point may be the same.

For example, a curvature of the first light input surface 121 in the horizontal direction and a curvature of the first light input surface 121 in the vertical direction may be same. As an example, the first light input surface 121 may be formed in an aspherical surface, but the present disclosure is not limited thereto. In this way, the first condensing lens part 120 is designed such that the curvatures thereof in the horizontal direction and the vertical direction have the same shape, and thus a position of the horizontal focal point and a position of the vertical focal point may be the same.

In this case, for example, the vertical focal point of the first condensing lens part 120 may coincide with the vertical focal point Fv1 of the first output lens part 140. Further, the horizontal focal point of the first condensing lens part 120 may coincide with the horizontal focal point FH1 of the first output lens part 140.

However, formation of the focal point of the first condensing lens part 120 is not limited thereto, and for example, FIGS. 12 and 13 illustrate a second embodiment of the first condensing lens part 120.

Referring to the second embodiment illustrated in FIGS. 12 and 13, the first condensing lens part 120 may defocus the light beam input from the first light source part 110 and then output the defocused light beam to the front side.

For example, the first condensing lens part 120 according to the second embodiment illustrated in FIGS. 12 and 13 may be designed such that a curvature thereof in the vertical direction and a curvature thereof in the horizontal direction have different shapes and may be formed such that the light beam passing through the first condensing lens part 120 does not form one focal point. Accordingly, the light distribution patterns formed by allowing the light beam to pass through the first condensing lens part 120 may be blurrily spread out, and accordingly, a low beam light distribution pattern in which the difference sense between the light distribution patterns is minimized and which has an uniform light beam may be formed.

In this case, the first condensing lens part 120 may be formed such that a degree to which the light beam output from the first condensing lens part 120 is defocused in the horizontal direction "H" is greater than a degree to which the light beam output from the first condensing lens part 120 is defocused in the vertical direction "V." Accordingly, a light distribution pattern that is spread long in the horizontal direction may be implemented, and thus visibility may be improved.

Meanwhile, referring to FIGS. 14 and 15, the second condensing lens part 220 may defocus the light beam input from the second light source part 210 and then output the defocused light beam to the front side. That is, the light beam defocused by the second condensing lens part 220 may be input into the second output lens part 240.

In detail, the light beam passing through the second condensing lens part 220 may not form one focal point in both the vertical direction "V" and the horizontal direction "H." Accordingly, the second light distribution pattern formed by the light beam passing through the second condensing lens part 220 may be relatively blurrily spread. Accordingly, a boundary between the first light distribution pattern and the second light distribution pattern is somewhat blurred, and thus the difference sense may be minimized, and the entire low beam light distribution pattern formed by the first light distribution pattern and the second light distribution pattern may be irradiated with a more uniform light beam.

Further, for example, the second condensing lens part 220 may be formed such that a degree to which the light beam output from the second condensing lens part 220 is defocused in the horizontal direction "H" is greater than a degree to which the light beam output from the second condensing lens part 220 is defocused in the vertical direction "V." Accordingly, the light distribution pattern that is long wide in the horizontal direction may be implemented, and thus the visibility may be improved.

The second condensing lens part 220 may be formed such that a curvature of the second output surface 243 in the horizontal direction is greater than a curvature of the second output surface 243 in the vertical direction. Accordingly, the degree to which the light beam output from the second condensing lens part 220 is defocused in the horizontal direction "H" is greater than the degree to which the light beam output from the second condensing lens part 220 is defocused in the vertical direction "V."

Further, for example, the light beam passing through the second condensing lens part 220 does not form one focal point, but is condensed in the vertical direction "V" or the horizontal direction "H", and thus is input into the second output lens part 240. In this case, the light beams passing through the second condensing lens part 220 may intersect with each other while condensed, and this intersection point may be positioned closer to the second output lens part 240 than the vertical focal point or the horizontal focal point of the second output lens part 240 (see FIGS. 14 and 15). However, it is noted that the concept of the above-described condensing is not an expression premised on a focus.

Meanwhile, referring to FIGS. 16 and the 17, in the third condensing lens part 320, a vertical focal point and a horizontal focal point may be the same.

For example, a curvature of the third light input surface 321 in the horizontal direction and a curvature of the third light input surface 321 in the vertical direction may be same. In this way, the third condensing lens part 320 is designed such that the curvatures thereof in the horizontal direction and the vertical direction have the same shape, and thus a position of the horizontal focal point and a position of the vertical focal point may be the same.

In this case, for example, the vertical focal point of the third condensing lens part 320 may coincide with the vertical focal point FV3 of the third output lens part 340. Further, the horizontal focal point of the third condensing lens part 320 may coincide with the horizontal focal point FH3 of the third output lens part 340.

However, formation of the focal point of the third condensing lens part 320 is not limited thereto, and for example, FIGS. 18 and 19 illustrate the second embodiment of the third condensing lens part 320.

Referring to the second embodiment illustrated in FIGS. 18 and 19, the third condensing lens part 320 may defocus the light beam input from the third light source part 310 and then output the defocused light beam to the front side.

For example, the third condensing lens part 320 according to the second embodiment illustrated in FIGS. 18 and 19 may be designed such that a curvature thereof in the vertical direction and a curvature thereof in the horizontal direction have different shapes and may be formed such that the light beam passing through the third condensing lens part 320 does not form one focal point. Accordingly, the light distribution patterns formed by allowing the light beam to pass through the third condensing lens part 320 may be blurrily spread out, and accordingly, the low beam light distribution pattern in which the difference sense between the light distribution patterns is minimized and which has an uniform light beam may be formed.

In this case, the third condensing lens part 320 may be formed such that a degree to which the light beam output from the third condensing lens part 320 is defocused in the horizontal direction "H" is greater than a degree to which the light beam output from the third condensing lens part 320 is defocused in the vertical direction "V." Accordingly, the light distribution pattern that is spread long in the horizontal direction may be implemented, and thus the visibility may be improved.

Hereinafter, for convenience of description, a distance between the first light source part 110 and the first output surface 143 of the first output lens part 140 is defined as a first separation distance L1, a distance between the second light source part 210 and the second output surface 243 of the second output lens part 240 is defined as a second separation distance L2, and a distance between the third light source part 310 and the third output surface 343 of the third output lens part 340 is defined as a third separation distance L3 (see L1, L2, and L3 of FIG. 20).

A shape of the first light distribution pattern may change according to the first separation distance L1 that is a distance between the first light source part 110 and the first output lens part 140. For example, when the first separation distance L1 is short, a range of the first distribution pattern may be wide, and when the first separation distance L1 is long, the range of the first distribution pattern may be narrow. This principle may be equally applied to the second light distribution pattern according to the second separation distance L2 and the third light distribution pattern according to the third separation distance L3.

For example, as in the first embodiment illustrated in FIG. 2, the first separation distance, the second separation distance, and the third separation distance may be the same.

In this case, the present disclosure may be designed such that characteristics of the respective light distribution patterns change according to shapes of the first condensing lens part 120, the second condensing lens part 220, and the third condensing lens part 320. Alternatively, in this case, the present disclosure may be designed such that the characteristics of the respective light distribution patterns change according to shapes of the first input surface 141, the second input surface 241, and the third input surface 341.

Meanwhile, for example, as in the first embodiment illustrated in FIG. 20, according to the present disclosure, the first separation distance L1, the third separation distance L3, and the second separation distance L2 are smaller in a sequence thereof.

In this case, the first light distribution pattern, the second light distribution pattern, and the third light distribution pattern may be more effectively implemented through the design in which the first separation distance L1, the third separation distance L3, and the second separation distance L2 are different in addition to the formation design of the first condensing lens part 120, the second condensing lens part 220, and the third condensing lens part 320 and the formation design of the first input surface 141, the second input surface 241, and the third input surface 341.

For example, the first light distribution pattern forms a hot zone of the low beam light distribution pattern, the third light distribution pattern is a high beam light distribution pattern that may be irradiated to a long distance, and thus the first separation distance L1 may be greater than the third separation distance L3.

Further, the second light distribution pattern forms a wide zone of the low beam light distribution pattern and thus needs to be formed in a wide range to secure a view of a surrounding area, and thus the second separation distance L2 may be greater than the first separation distance L1 and the third separation distance L3.

However, the first separation distance L1, the second separation distance L2, and the third separation distance L3 are not limited to the embodiment illustrated in FIGS. 2 and 20 and may be variously changed according to design specifications.

Meanwhile, the first optical module 100, the second optical module 200, and the third optical module 300 may be variously arranged.

For example, as illustrated in FIG. 2, in the vehicle lamp 10, the first optical module 100, the second optical module 200, and the third optical module 300 may be arranged downward in a sequence thereof.

However, in this case, when only one of the high beam light distribution pattern and the low beam light distribution pattern is implemented by the vehicle lamp 10, when viewed from the outside, only a portion of the vertical vehicle lamp 10 is lighted, and thus it seems that design of the lamp changes. Accordingly, according to the present disclosure, as the first optical module 100, the second optical module 200, and the third optical module 300 are variously arranged, and thus even when only one of the high beam light distribution pattern and the low beam light distribution pattern is implemented, an effect may be provided as if the entire vertical vehicle lamp 10 is lighted.

For example, as in the second embodiment illustrated in FIG. 21, the first optical module 100, the second optical module 200, and the third optical module 300 may be alternately arranged.

In detail, the second optical module 200 may be disposed under the first optical module 100, and the first optical module 100, the second optical module 200, and the third optical module 300 may be provided in plurality.

Further, the plurality of third optical modules 300 may be arranged between the neighboring first optical modules 100, between the neighboring first optical module 100 and second optical module 200, and between the neighboring second optical modules 200.

Accordingly, the plurality of third optical modules 300 forming the third light distribution pattern that is a high beam pattern may be arranged between the first optical module 100 and the second optical module 200 forming the first light distribution pattern and the second light distribution pattern that are the low beam light distribution patterns.

In this case, even when only one of the high beam light distribution pattern and the low beam light distribution pattern is implemented, an effect may be obtained as if the entire vertical vehicle lamp 10 is lighted. For example, when only the high beam pattern is formed, the first optical module 100 and the second optical module 200 are not lighted, but the third optical module 300 disposed therebetween is lighted, and thus when viewed from the outside, may be seen as the vertically long vehicle lamp 10 with a difference in light quantity.

Thus, accordingly, in any case, lighting image design of the lamp may be maintained.

Meanwhile, hereinafter, a vehicle lamp 10' according to a third embodiment of the present disclosure will be described with reference to FIGS. 22 to 35. A configuration for implementing a first sub-light distribution pattern, a second sub-light distribution pattern, and a third sub-light distribution pattern according to the first embodiment or the second embodiment may be added to the third embodiment of the present disclosure.

Thus, the third embodiment of the present disclosure may include all of the configurations of the first embodiment or the second embodiment described above. Hereinafter, a duplicated description of the same configuration will be omitted.

Referring to FIGS. 22 to 26, the vehicle lamp 10' according to the third embodiment of the present disclosure includes a first optical module 100', a second optical module 200', and a third optical module 300'.

The first optical module 100' includes a first light source part 110' for forming the first light distribution pattern, the second optical module 200' includes a second light source part 210' for forming the second light distribution pattern, and the third optical module 300' includes a third light source part 310' for forming the third light distribution pattern.

Here, the first light distribution pattern, the second light distribution pattern, and the third light distribution pattern may be formed to have different light distribution characteristics, and the first light distribution pattern and the second light distribution pattern may overlap each other to form the low beam light distribution pattern. Further, the third light distribution pattern may be provided to form the high beam light distribution pattern.

The first optical module 100' may further include a first output lens part 140' that outputs a light beam irradiated from the first light source part 110' and a first sub-light source part 170. The second optical module 200' may further include a second output lens part 240' that outputs a light beam irradiated from the second light source part 210' and a second sub-light source part 270. The third optical module 300' may further include a third output lens part 340' that outputs a light beam irradiated from the third light source part 310' and a third sub-light source part 370.

Further, the first optical module 100', the second optical module 200', and the third optical module 300' may be arranged in the vertical direction, and the first output lens part 140', the second output lens part 240', and the third output lens part 340' may be integrally formed in the vertical direction.

The first optical module 100' may further include a first condensing lens part 120' for condensing the light beam irradiated from the first light source part 110' or the first sub-light source part 170. Further, the second optical module 200' may further include a second condensing lens part 220' for condensing the light beam irradiated from the second light source part 210' or the second sub-light source part 270. Further, the third optical module 300' may further include a third condensing lens part 320' for condensing the light beam irradiated from the third light source part 310' or the third sub-light source part 370.

Further, referring to FIGS. 22 to 26, the first optical module 100' further includes the first sub-light source part 170 that is lighted individually with the first light source part 110' and forms the first sub-light distribution pattern and a first reflector 180 that reflects the light beam irradiated from the first sub-light source part 170.

Further, the second optical module 200' further includes the second sub-light source part 270 that is lighted individually with the second light source part 210' and forms the second sub-light distribution pattern and a second reflector 280 that reflects the light beam irradiated from the second sub-light source part 270.

The third optical module 300' further includes the third sub-light source part 370 that is lighted individually with the third light source part 310' and forms the third sub-light distribution pattern and a third reflector 380 that reflects the light beam irradiated from the third sub-light source part 370.

Further, each of the first reflector 180, the second reflector 280, and the third reflector 380 includes a curved reflective surface that reflects the light beam.

In detail, the first optical module 100' and the second optical module 200' may be provided to form the low beam light distribution pattern of the head lamp, and the third optical module 300' may be provided to form the high beam pattern of the head lamp.

In addition, according to the third embodiment of the present disclosure, the first optical module 100' may further include the first sub-light source part 170 and the first reflector 180 and may implement the first sub-light distribution pattern using the first sub-light source part 170, the first condensing lens part 120', the first reflector 180, and the first output lens part 140'.

Further, the second optical module 200' may further include the second sub-light source part 270 and the second reflector 280 and may implement the second sub-light distribution pattern using the second sub-light source part 270, the second condensing lens part 220', the second reflector 280, and the second output lens part 240'.

The third optical module 300' may further include the third sub-light source part 370 and the third reflector 380 and may implement the third sub-light distribution pattern using the third sub-light source part 370, the third condensing lens part 320', the third reflector 380, and the third output lens part 340'.

The first sub-light distribution pattern, the second sub-light distribution pattern, the third sub-light distribution pattern, and overlapping patterns thereof may form patterns having different characteristics from those of the first light distribution pattern, the second light distribution pattern, the third light distribution pattern, and overlapping patterns thereof.

Meanwhile, the present disclosure may include a first lamp unit 10*a* and a second lamp unit 10*b* (see FIG. 1).

The first lamp unit 10*a* may include the first optical module 100', the second optical module 200', and the third optical module 300'.

The second lamp unit 10*b* is provided to form a main light distribution pattern and may include a main light source part and a main lens part provided to output a light beam input from the main light source part.

Further, the main light source part may be lighted together with the first sub-light source part 170, the second sub-light source part 270, and the third sub-light source part 370.

For example, the first lamp unit 10*a* may be a head lamp that implements the low beam light distribution pattern and the high beam pattern. Further, the second lamp unit 10*b* may be disposed side by side with the first lamp unit 10*a* and may be a daytime running lamp or a turn signal lamp.

The daytime running lamp is a lamp device that is lighted separately from the head lamp of the vehicle so that other drivers or pedestrians may easily recognize the vehicle when the vehicle travels during daytime. Further, the turn signal lamp is a lamp that notifies a surrounding vehicle of a traveling direction of the vehicle. However, the types of the first lamp unit 10*a* and the second lamp unit 10*b* are not limited to the above description.

In detail, the main light distribution pattern, the first sub-light distribution pattern, the second sub-light distribution pattern, and the third sub-light distribution pattern may overlap each other to form at least one of a daytime running pattern and a turn signal pattern.

When the first lamp unit 10*a* and the second lamp unit 10*b* are installed adjacent to the vehicle, and when the first lamp unit 10*a* is lighted together when the second lamp unit 10*b* is lighted, customer's preference is satisfied, and thus design of the vehicle may be differentiated.

Accordingly, according to the third embodiment of the present disclosure, the first lamp unit 10*a* may include the first light source part 110', the second light source part 210', and the third light source part 310' for functioning as the head lamp that is a main function, and at the same time, the first lamp unit 10*a* may additionally include the first sub-light source part 170, the second sub-light source part 270, and the third sub-light source part 370 that are to be lighted together when the second lamp unit 10*b* is lighted.

Here, light distribution performance of a daytime running lamp function, a turn signal lamp function, or the like, prescribed by the law, may be satisfied by the second lamp unit 10*b*. Further, when the second lamp unit 10*b* is lighted, the first sub-light distribution pattern, the second sub-light distribution pattern, and the third sub-light distribution pattern that are implemented by the lighting of the first lamp unit 10*a* only provides a light effect together with the main light distribution pattern. However, according to the determination of the law, an entire light distribution pattern obtained by combining the main light distribution pattern and the first, second and third sub-light distribution patterns may be progressed.

Referring to FIGS. 27 to 29, the first reflector 180 may include a (1-1)th reflector 181 and a (1-2)th reflector 183.

The (1-1)th reflector 181 may have a (1-1)th reflective surface 182 that reflects the light beam irradiated from the first sub-light source part 170 and is formed in a curved surface on a lower surface thereof.

The (1-2)th reflector 183 may have a (1-2)th reflective surface 184 that reflects the light beam reflected from the (1-1)th reflective surface 182 to the first output lens part 140' and is formed in a curved surface on an upper surface thereof.

The light beam irradiated from the first sub-light source part 170 may be refracted by the first condensing lens part 120' and reach the (1-1)th reflective surface 182. The (1-1)th reflective surface 182 may be formed at a predetermined angle to reflect the light beam toward the (1-2)th reflective surface 184. The light beam reaching the (1-1)th reflective surface 182 may be uniformly input to the entire input surface of the first output lens part 140' (see FIGS. 28 and 29).

In this way, in the first reflector 180 according to the third embodiment of the present disclosure, since the (1-1)th reflective surface 182 and the (1-2)th reflective surface 184 are formed in the curved surfaces, the light beam may be uniformly input to a first input surface 141' of the first output lens part 140', and accordingly, light uniformity of the first sub-light distribution pattern may be improved. Non-described numeral 143' is a first output surface.

Here, the (1-1)th reflector 181 and the (1-2)th reflector 183 may be formed at positions at which a path of the light beam generated from the first light source part 110' and passing through the first output lens part 140' is not obstructed when the first light distribution pattern is formed by the lighting of the first light source part 110'.

Referring to FIG. 27, a height of the first sub-light source part 170 may be smaller than a height of a center of the first condensing lens part 120' and greater than a height of a lower end of the first condensing lens part 120'.

In detail, the first light source part 110' may be positioned at a height of a center of a first light input surface 121' of the first condensing lens part 120', and the first sub-light source part 170 may be positioned at a position lower than that of the first light source part 110'.

In more detail, when a point between the lower end of the first condensing lens part 120' and the center of the first condensing lens part 120' is referred to as a first lower midpoint, the height of the first sub-light source part 170 may be formed greater than the height of the lower end of the first condensing lens part 120' and smaller than a height of the first lower midpoint.

Accordingly, the light beam irradiated from the first sub-light source part 170 may form a light path toward the (1-1)th reflector 181 without interfering by the first light source part 110'.

The (1-1)th reflector 181 may have a concave lower surface and a vertical cross section formed in a partial shape of an ellipse.

In detail, referring to FIGS. 22 and 27, the (1-1)th reflective surface 182 may be concavely formed on the lower surface of the (1-1)th reflector 181 and have a shape of the vertical cross section extending in an optical axis direction, which is formed as a partial shape of a virtual ellipse RE1.

For example, a pair of focal points EF1 of the virtual ellipse RE1 may be positioned on a first light output surface 123' and the (1-2)$^{th}$ reflective surface 184. Accordingly, the (1-1)$^{th}$ reflective surface 182 may be formed in a curved surface while inclined downward by a predetermined angle toward to the front side. Accordingly, the (1-1)$^{th}$ reflective surface 182 may reflect the light beam and transmit the light beam to the (1-2)$^{th}$ reflective surface 184 while light loss is minimized. Further, due to the curved surface of the (1-1)$^{th}$ reflective surface 182, the light beam from the first sub-light source part 170 may be uniformly distributed on the light path.

Meanwhile, the (1-2)th reflector 183 may have an convex upper surface and have a vertical cross section that is formed in a partial shape of a circle RC1.

In detail, referring to FIGS. 22 and 27, the (1-2)th reflective surface 184 may be convexly formed on the upper surface of the (1-2)th reflector 183. Further, a shape of the vertical virtual cross section of the (1-2)th reflective surface 184 extending in the optical axis direction may be formed in a partial shape of the virtual circle RC1.

For example, the (1-2)th reflector 183 may be formed integrally with a first shield part 130' and may extend forward from a front surface of the first shield part 130'. As the (1-2)$^{th}$ reflective surface 184 is convexly formed in a curved surface, the light beam reflected by and transmitted from the (1-1)th reflective surface 182 is reflected and thus may be input to the entire first input surface 141' of the first output lens part 140' in an uniformly distributed state.

The (1-1)th reflective surface 182 and the (1-2)th reflective surface 184 may be formed by coating the (1-1)th reflector 181 and the (1-2)th reflector 183 with a widely known reflective material. However, the present disclosure is not limited thereto, and for example, the (1-1)$^{th}$ reflector 181 and the (1-2)th reflector 183 may be made of a material that may reflect a light beam.

The (1-1)th reflective surface 182 may be positioned on the (1-2)th reflective surface 184. Further, the (1-1)th reflective surface 182 and the (1-2)th reflective surface 184 may be formed at positions at which the path of the light beam generated by the first light source part 110' is not obstructed.

Further, a height of the (1-1)th reflective surface 182 may be formed greater than the height of the center of the first condensing lens part 120'. In more detail, when a midpoint between an upper end of the first condensing lens part 120' and the center of the first condensing lens part 120' is referred to as a first upper midpoint, the (1-1)$^{th}$ reflective surface 182 may be positioned higher than the first upper midpoint.

Meanwhile, a focal point FR1 of the (1-1)th reflective surface 182 may be positioned on the (1-2)th reflective surface 184. Accordingly, the light loss may be minimized.

In more detail, a height of the focal point FR1 of the (1-1)th reflective surface 182 may be smaller than a height of the vertical focal point FV1 of the first output lens part 140' by a distance d1 that is 1/10 a vertical focal distance f11 of the first output lens part 140'.

Referring to FIGS. 30 to 32, the second reflector 280 may include a (2-1)th reflector 281 and a (2-2)th reflector 283.

The (2-1)th reflector 281 may have a (2-1)th reflective surface 282 that reflects the light beam irradiated from the second sub-light source part 270 and is formed in a curved surface on a lower surface thereof.

The (2-2)th reflector 283 may have a (2-2)th reflective surface 284 that reflects the light beam reflected from the (2-1)th reflective surface 282 to the second output lens part 240' and is formed in a curved surface on an upper surface thereof.

The light beam irradiated from the second sub-light source part 270 may be refracted by the second condensing lens part 220' and reach the (2-1)th reflective surface 282. The (2-1)th reflective surface 282 may be formed at a predetermined angle to reflect the light beam toward the (2-2)th reflective surface 284. The light beam reaching the (2-1)th reflective surface 282 may be uniformly input to the entire input surface of the second output lens part 240' (see FIGS. 28 and 29).

In this way, in the second reflector 280 according to the third embodiment of the present disclosure, since the (2-1)th reflective surface 282 and the (2-2)th reflective surface 284 are formed in the curved surfaces, the light beam may be uniformly input to a second input surface 241' of the second output lens part 240', and accordingly, light uniformity of the second sub-light distribution pattern may be improved.

Here, the (2-1)th reflector 281 and the (2-2)th reflector 283 may be formed at positions at which a path of the light beam generated from the second light source part 210' and passing through the second output lens part 240' is not obstructed when the second light distribution pattern is formed by the lighting of the second light source part 210'.

Referring to FIG. 27, a height of the second sub-light source part 270 may be smaller than a height of a center of the second condensing lens part 220' and greater than a height of a lower end of the second condensing lens part 220'.

In detail, the second light source part 210' may be positioned at a height of a center of a second light input surface 221' of the second condensing lens part 220', and the second sub-light source part 270 may be positioned at a position lower than that of the second light source part 210'.

In more detail, when a point between the lower end of the second condensing lens part 220' and the center of the second condensing lens part 220' is referred to as a second lower midpoint, the height of the second sub-light source part 270 may be formed greater than the height of the lower end of the second condensing lens part 220' and lower than a height of the second lower midpoint.

Accordingly, the light beam irradiated from the second sub-light source part 270 may form a light path toward the (2-1)th reflector 281 without interfering by the second light source part 210'. Further, accordingly, the second sub-light distribution pattern may be formed in a wider area than that of the first sub-light distribution pattern (see FIGS. 31 and 32).

The (2-1)th reflector 281 may have a concave lower surface and a vertical cross section formed in a partial shape of an ellipse.

In detail, referring to FIGS. 22 and 27, the (2-1)th reflective surface 282 may be concavely formed on the lower surface of the (2-1)th reflector 281 and have a shape of the vertical cross section extending in an optical axis direction, which is formed as a partial shape of a virtual ellipse RE2.

For example, a pair of focal points of the virtual ellipse RE2 may be positioned on a second light output surface 223' and the (2-2)th reflective surface 284. Accordingly, the (2-1)th reflective surface 282 may be formed in a curved surface while inclined downward by a predetermined angle toward to the front side. Accordingly, the (2-1)th reflective surface 282 may reflect the light beam and transmit the light beam to the (2-2)th reflective surface 284 while light loss is minimized. Further, due to the curved surface of the (2-1)th reflective surface 282, the light beam from the second sub-light source part 270 may be uniformly distributed on the light path.

Meanwhile, the (2-2)th reflector 283 may have an convex upper surface and have a vertical cross section that is formed in a partial shape of a circle RC2.

In detail, referring to FIGS. 22 and 27, the (2-2)th reflective surface 284 may be convexly formed on the upper surface of the (2-2)th reflector 283. Further, a shape of the vertical virtual cross section of the (2-2)th reflective surface 284 extending in the optical axis direction may be formed in a partial shape of the virtual circle RC2.

For example, the (2-2)th reflector 283 may be formed integrally with a second shield part 230' and may extend forward from a front surface of the second shield part 230'. As the (2-2)th reflective surface 284 is convexly formed in a curved surface, the light beam reflected by and transmitted from the (2-1)th reflective surface 282 is reflected and thus may be input to the entire second input surface 241' of the second output lens part 240' in an uniformly distributed state. Non-described numeral 243' is a second output surface.

The (2-1)th reflective surface 282 and the (2-2)th reflective surface 284 may be formed by coating the (2-1)th reflector 281 and the (2-2)th reflector 283 with a widely known reflective material. However, the present disclosure is not limited thereto, and for example, the (2-1)th reflector 281 and the (2-2)th reflector 283 may be made of a material that may reflect a light beam.

The (2-1)th reflective surface 282 may be positioned on the (2-2)th reflective surface 284. Further, the (2-1)th reflective surface 282 and the (2-2)th reflective surface 284 may be formed at positions at which the path of the light beam generated by the second light source part 210' is not obstructed.

Further, a height of the (2-1)th reflective surface 282 may be formed greater than the height of the center of the second condensing lens part 220'. In more detail, when a midpoint between an upper end of the second condensing lens part 220' and the center of the second condensing lens part 220' is referred to as a second upper midpoint, the (2-1)th reflective surface 282 may be positioned higher than the second upper midpoint.

Meanwhile, a focal point FR2 of the (2-1)th reflective surface 282 may be positioned on the (2-2)th reflective surface 284. Accordingly, the light loss may be minimized.

In more detail, a height of the focal point FR2 of the (2-1)th reflective surface 282 may be smaller than a height of the vertical focal point FV2 of the second output lens part 240' by a distance d2 that is ⅕ a vertical focal distance f22 of the second output lens part 240'.

Accordingly, the second sub-light distribution pattern may be formed in a wider area than that of the first sub-light distribution pattern (see FIGS. 31 and 32).

Referring to FIGS. 33 to 35, the third reflector 380 may include a (3-1)th reflector 381 and a (3-2)th reflector 383.

The (3-1)th reflector 381 may have a (3-1)th reflective surface 382 that reflects the light beam irradiated from the third sub-light source part 370 and is formed in a curved surface on a lower surface thereof.

The (3-2)th reflector 383 may have a (3-2)th reflective surface 384 that reflects the light beam reflected from the (3-1)th reflective surface 382 to the third output lens part 340' and is formed in a curved surface on an upper surface thereof.

The light beam irradiated from the third sub-light source part 370 may be refracted by the third condensing lens part 320' and reach the (3-1)th reflective surface 382. The (3-1)th reflective surface 382 may be formed at a predetermined angle to reflect the light beam toward the (3-2)th reflective surface 384. The light beam reaching the (3-1)th reflective surface 382 may be uniformly input to the entire input surface of the third output lens part 340' (see FIGS. 28 and 29).

In this way, in the third reflector 380 according to the third embodiment of the present disclosure, since the (3-1)th reflective surface 382 and the (3-2)th reflective surface 384 are formed in the curved surfaces, the light beam may be uniformly input to a third input surface 341' of the third output lens part 340', and accordingly, light uniformity of the third sub-light distribution pattern may be improved.

Here, the (3-1)th reflector 381 and the (3-2)th reflector 383 may be formed at positions at which a path of the light beam generated from the third light source part 310' and passing through the third output lens part 340' is not obstructed when the third light distribution pattern is formed by the lighting of the third light source part 310'.

Referring to FIG. 27, a height of the third sub-light source part 370 may be smaller than a height of a center of the third condensing lens part 320' and greater than a height of a lower end of the third condensing lens part 320'.

In detail, the third light source part 310' may be positioned at a height of a center of a third light input surface 321' of the third condensing lens part 320', and the third sub-light source part 370 may be positioned at a position lower than that of the third light source part 310'.

In more detail, when a point between the lower end of the third condensing lens part 320' and the center of the third condensing lens part 320' is referred to as a third lower midpoint, the height of the third sub-light source part 370 may be formed greater than the height of the lower end of the third condensing lens part 320' and smaller than a height of the third lower midpoint.

Accordingly, the light beam irradiated from the third sub-light source part 370 may form a light path toward the (3-1)th reflector 381 without interfering by the third light source part 310'.

The (3-1)th reflector 381 may have a concave lower surface and a vertical cross section formed in a partial shape of an ellipse.

In detail, referring to FIGS. 22 and 27, the (3-1)th reflective surface 382 may be concavely formed on the lower surface of the (3-1)th reflector 381 and have a shape of the vertical cross section extending in an optical axis direction, which is formed as a partial shape of a virtual ellipse RE3.

For example, a pair of focal points of the virtual ellipse RE3 may be positioned on a third light output surface 323' and the (3-2)th reflective surface 384. Accordingly, the (3-1)th reflective surface 382 may be formed in a curved surface while inclined downward by a predetermined angle toward to the front side. Accordingly, the (3-1)th reflective surface 382 may reflect the light beam and transmit the light beam to the (3-2)th reflective surface 384 while light loss is minimized. Further, due to the curved surface of the (3-1)th reflective surface 382, the light beam from the third sub-light source part 370 may be uniformly distributed on the light path.

Meanwhile, the (3-2)th reflector 383 may have an convex upper surface and have a vertical cross section that is formed in a partial shape of a circle RC3.

In detail, referring to FIGS. 22 and 27, the (3-2)th reflective surface 384 may be convexly formed on the upper surface of the (3-2)th reflector 383. Further, a shape of the vertical virtual cross section of the (3-2)th reflective surface 384 extending in the optical axis direction may be formed in a partial shape of the virtual circle RC3.

For example, the (3-2)th reflector 383 may be formed integrally with a third shield part and may extend forward from a front surface of the third shield part. As the (3-2)th reflective surface 384 is convexly formed in a curved surface, the light beam reflected by and transmitted from the (3-1)th reflective surface 382 is reflected and thus may be input to the entire third input surface 341' of the third output lens part 340' in an uniformly distributed state. Non-described numeral 343' is a third output surface.

The (3-1)th reflective surface 382 and the (3-2)th reflective surface 384 may be formed by coating the (3-1)th reflector 381 and the (3-2)th reflector 383 with a widely known reflective material. However, the present disclosure is not limited thereto, and for example, the (3-1)th reflector 381 and the (3-2)th reflector 383 may be made of a material that may reflect a light beam.

The (3-1)th reflective surface 382 may be positioned on the (3-2)th reflective surface 384. Further, the (3-1)th reflective surface 382 and the (3-2)th reflective surface 384 may be formed at positions at which the path of the light beam generated by the third light source part 310' is not obstructed.

Further, a height of the (3-1)th reflective surface 382 may be formed greater than the height of the center of the third condensing lens part 320'. In more detail, when a midpoint between an upper end of the third condensing lens part 320' and the center of the third condensing lens part 320' is referred to as a third upper midpoint, the (3-1)th reflective surface 382 may be positioned higher than the third upper midpoint.

Meanwhile, a focal point FR3 of the (3-1)th reflective surface 382 may be positioned on the (3-2)th reflective surface 384. Accordingly, the light loss may be minimized.

In more detail, a height of the focal point FR3 of the (3-1)th reflective surface 382 may be smaller than a height of the vertical focal point FV3 of the third output lens part 340' by a distance d3 that is 1/10 a vertical focal distance f33 of the third output lens part 340'.

Meanwhile, hereinafter, an optical module according to another aspect of the present disclosure will be described. The optical module, which will be described below, may be a first optical module or a second optical module. Hereinafter, a case in which the optical module is the first optical module will be described as an example, and for convenience of description, reference numerals of the optical module and the components thereof will be described with the same reference numerals as those of the first optical module and components thereof. For example, the reflector, the first reflector, the second reflector, the first reflective surface, and the second reflective surface that are the components of the optical module use the same reference numerals as those of the (1-1)th reflector, the (1-2)th reflector, the (1-1)th reflective surface, and the (1-2)th reflective surface of the first optical module.

The optical module according to the present disclosure includes the light source part 110 for forming a predetermined light distribution pattern, the sub-light source part 170 that is lighted individually with the light source part 110 and forms a predetermined sub-light distribution pattern, the reflector 180 that reflects a light beam irradiated from the sub-light source part 170, the condensing lens part 120 that condenses the light beam emitted from the light source part 110 or the sub-light source part 170, the output lens part 140 that outputs the light beam irradiated from the light source part 110 and the sub-light source part 170, and the shield part 130 that is provided between the condensing lens part 120 and the output lens part 140 and blocks a portion of the light beam.

The first reflector 180 includes the first reflector 181 having the first reflective surface 182 that reflects the light beam irradiated from the first sub-light source part 170 and is formed in a curved surface on a lower surface thereof and the second reflector 183 having the second reflective surface 184 that reflects the light beam reflected by the first reflective surface 182 to the output lens part 140 and is formed in a curved surface on an upper surface thereof.

According to the embodiment of the present disclosure, the first output lens part, the second output lens part, and the third output lens part arranged on the front side are integrally formed, and thus a lighting image having a continuous image without a disconnection sense in a lighted state may be formed.

Thus, according to the present disclosure, differentiation in design of the vehicle lamp may be secured, thereby increasing the competitiveness of a product.

According to an embodiment of the present disclosure, when a signal lamp or a daytime running lamp is lighted, a lamp for forming a low beam/high beam pattern is lighted together, and thus a customer's preference is satisfied, and differentiation in design of a vehicle may be implemented.

Further, according to the embodiment of the present disclosure, the reflective surfaces are formed in curved surfaces, and thus light uniformity of the first, second, and third sub-light distribution patterns may be improved.

Thus, according to the present disclosure, the differentiation in design of the vehicle lamp may be secured, thereby increasing the competitiveness of a product.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A vehicle lamp comprising:

a first optical module comprising a first light source part configured to form a first light distribution pattern, a first sub-light source part configured to form a first sub-light distribution pattern, a first reflector configured to reflect a light beam irradiated from the first sub-light source part, a first output lens part configured to output the light beam irradiated from the first light source part and the first sub-light source part, and a first condensing lens part configured to condense the light beam emitted from the first light source part or the first sub-light source part;

a second optical module comprising a second light source part configured to form a second light distribution pattern, a second sub-light source part configured to form a second sub-light distribution pattern, a second reflector configured to reflect a light beam irradiated from the second sub-light source part, a second output lens part configured to output the light beam emitted from the second light source part and the second sub-light source part, and a second condensing lens part configured to condense the light beam emitted from the second light source part or the second sub-light source part; and a third optical module comprising a third light source part configured to form a third light distribution pattern, a third sub-light source part configured to form a third sub-light distribution pattern, a third reflector configured to reflect a light beam irradiated from the third sub-light source part, a third output lens part configured to output the light beam emitted from the third light source part and the third sub-light source part, and a third condensing lens part configured to condense the light beam emitted from the third light source part or the third sub-light source part, wherein each of the first reflector, the second reflector, and the third reflector comprise a first sub-reflector and second sub-reflector, the first sub-reflector configured to reflect the light beam irradiated from the respective sub-light source part and formed in a curved surface on a lower surface thereof, and the second sub-reflector configured to reflect the light beam reflected from the first reflector to a respective output lens part and formed in a curved surface on an upper surface thereof, wherein the second sub-reflector has a convex upper surface and a vertical cross-section formed as a partial shape of a virtual circle wherein the first optical module, the second optical module, and the third optical module are arranged in a vertical direction, and the first output lens part, the second output lens part, and the third output lens part are integrally formed in the vertical direction.

2. The vehicle lamp of claim 1, further comprising:

a first lamp unit comprising the first optical module, the second optical module, and the third optical module; and a second lamp unit configured to form a combined light distribution pattern and comprising a combined light source part and a combined lens part configured to output a light beam input from the combined light source part, wherein the combined light source part is lighted together with the first sub-light source part, the second sub-light source part, and the third sub-light source part.

3. The vehicle lamp of claim 2, wherein:

the first light distribution pattern, the second light distribution pattern, and the third light distribution pattern are formed to have different light distribution characteristics, the first light distribution pattern and the second light distribution pattern overlap each other to form a low beam light distribution pattern, and the third light distribution pattern forms a high beam light distribution pattern.

4. The vehicle lamp of claim 2, wherein the combined light distribution pattern, the first sub-light distribution pattern, the second sub-light distribution pattern, and the third sub-light distribution pattern overlap each other to form at least one of a daytime running pattern and a turn signal pattern.

5. The vehicle lamp of claim 1, wherein:

a position of the first sub-light source part is lower than a center of the first condensing lens part and higher than a lower end of the first condensing lens part, a position of the second sub-light source part is lower than a center of the second condensing lens part and higher than a lower end of the second condensing lens part, and a position of the third sub-light source part is lower than a center of the third condensing lens part and higher than a lower end of the third condensing lens part.

6. The vehicle lamp of claim 1, wherein each of the first sub-reflectors has a concave lower surface and a vertical cross section formed as a partial shape of a virtual ellipse.

7. The vehicle lamp of claim 1, wherein:

each of the first sub-reflectors is positioned before each of the second sub-reflectors in a light path.

8. The vehicle lamp of claim 1, wherein a position of each of the first sub-reflectors is higher than a center of each of the first condensing lens part, the second condensing lens part, and the third condensing lens part.

9. The vehicle lamp of claim 1, wherein:

a focal point of each of the first sub-reflectors is positioned on each of the second sub-reflectors.

10. The vehicle lamp of claim 1, wherein when a point between a lower end of the first condensing lens part and a center of the first condensing lens part is referred to as a first lower midpoint, a position of the first sub-light source part is higher than a height of the lower end of the first condensing lens part and lower than the first lower midpoint.

11. The vehicle lamp of claim 1, wherein a position of a focal point of the first sub-reflector of the first reflector is lower than a vertical focal point of the first output lens part by a distance that is 1/10 a vertical focal distance of the first output lens part.

12. The vehicle lamp of claim 1, wherein when a point between a lower end of the second condensing lens part and a center of the second condensing lens part is referred to as a second lower midpoint, a position of the second sub-light source part is higher than the lower end of the second condensing lens part and lower than the second lower midpoint.

13. The vehicle lamp of claim 1, wherein a position of a focal point of the first sub-reflector of the second reflector is lower than a vertical focal point of the second output lens part by a distance that is 1/5 a vertical focal distance of the second output lens part.

14. The vehicle lamp of claim 1, wherein when a point between a lower end of the third condensing lens part and a center of the third condensing lens part is referred to as a third lower midpoint, a position of the third sub-light source part is higher than a height of the lower end of the third condensing lens part and lower than the third lower midpoint.

15. The vehicle lamp of claim 1, wherein a position of a focal point of the first sub-reflector of the third reflector lower than a vertical focal point of the third output lens part by a distance that is 1/10 a vertical focal distance of the third output lens part.

16. An optical module comprising:

a light source part configured to form a predetermined light distribution pattern;

a sub-light source part configured to form a sub-light distribution pattern;

a reflector configured to reflect a light beam irradiated from the sub-light source part;

a condensing lens part configured to condense the light beam emitted from the light source part or the sub-light source part;

an output lens part configured to output the light beam irradiated from the light source part and the sub-light source part; and a shield part provided between the condensing lens part and the output lens part and configured to block a portion of the light beam, wherein the reflector comprises:

a first reflector having a first reflective surface configured to reflect the light beam irradiated from the sub-light source part and formed in a curved surface on a lower surface thereof, and a second reflector having a second reflective surface configured to reflect the light beam reflected from the first reflective surface to the output lens part and formed in a curved surface on an upper surface thereof, wherein the second reflector has a convex upper surface and a vertical cross-section formed as a partial shape of a virtual circle.

* * * * *